(12) United States Patent
Oh et al.

(10) Patent No.: US 12,512,157 B2
(45) Date of Patent: Dec. 30, 2025

(54) NON-VOLATILE MEMORY DEVICE INCLUDING SUB-BLOCKS HAVING DIFFERENT SIZES AND STORAGE DEVICE

(71) Applicant: SAMSUNG ELECTRONICS CO., LTD., Suwon-si (KR)

(72) Inventors: Eun Chu Oh, Suwon-si (KR); Beomkyu Shin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 196 days.

(21) Appl. No.: 18/239,576

(22) Filed: Aug. 29, 2023

(65) Prior Publication Data

US 2024/0168669 A1 May 23, 2024

(30) Foreign Application Priority Data

Nov. 18, 2022 (KR) .................. 10-2022-0155801

(51) Int. Cl.
*G11C 16/04* (2006.01)
*G11C 5/02* (2006.01)
*G11C 16/08* (2006.01)

(52) U.S. Cl.
CPC .............. *G11C 16/08* (2013.01); *G11C 5/025* (2013.01); *G11C 16/0483* (2013.01); *G11C 2211/5641* (2013.01)

(58) Field of Classification Search
CPC ..... G11C 16/08; G11C 5/025; G11C 16/0483; G11C 2211/5641; G11C 11/5621;
(Continued)

(56) References Cited

U.S. PATENT DOCUMENTS 7,508,732 B2 * 3/2009 Park .................... G11C 11/5642
365/189.05
9,620,201 B1 4/2017 Lai et al.
(Continued)

FOREIGN PATENT DOCUMENTS

| CN | 113168870 A | 7/2021 |
| CN | 114613415 A | 6/2022 |
| WO | 2021/155557 A1 | 8/2021 |

OTHER PUBLICATIONS

Communication dated Feb. 19, 2024, issued by European Patent Office in European Patent Application No. 23194489.3.

*Primary Examiner* — Tha-O H Bui
(74) *Attorney, Agent, or Firm* — Sughrue Mion, PLLC

(57) ABSTRACT

A non-volatile memory device is provided. The non-volatile memory device includes: sub-blocks provided on a substrate. The sub-blocks include: a first sub-block connected to a first word line group including a first number of word lines; and a second sub-block connected to a second word line group including a second number of word lines. The first sub-block includes: at least one first memory cell storing M-bit data; and second memory cells each storing N-bit data. The second sub-block includes: at least one third memory cell storing K-bit data; and fourth memory cells each storing L-bit data. M, N, K, and L are positive integers, N is greater than M, and L is greater than K. The first number and the second number are different, and the at least one first memory cell and the at least one third memory cell include different numbers of memory cells.

20 Claims, 27 Drawing Sheets

(58) Field of Classification Search
CPC ........ G11C 16/14; G11C 16/16; H10B 43/27; H10B 53/20; G06F 3/0658; G06F 3/0679
USPC .................................................... 365/185.11
See application file for complete search history.

(56) References Cited

U.S. PATENT DOCUMENTS

| | | |
|---|---|---|
| 9,754,670 B1 | 9/2017 | Choi |
| 10,431,314 B2 * | 10/2019 | Kim .................... G11C 16/0483 |
| 10,784,282 B2 | 9/2020 | Katkar et al. |
| 11,404,122 B2 | 8/2022 | Chibvongodze et al. |
| 2013/0198440 A1 | 8/2013 | Oh et al. |
| 2021/0134778 A1 | 5/2021 | Huang et al. |
| 2022/0028885 A1 | 1/2022 | Kim et al. |

* cited by examiner

| LPN | PPN |
|---|---|
| LPN_1a | PPN_1a |
| LPN_1b | PPN_1b |
| LPN_1c | PPN_1c |
| ... | ... |
| LPN_1m | PPN_1m |

| LPN | PPN |
|---|---|
| LPN_2a | PPN_2a |
| LPN_2b | PPN_2b |
| LPN_2c | PPN_2c |
| ... | ... |
| LPN_2m | PPN_2m |

| LPN | PPN |
|---|---|
| LPN_3a | PPN_3a |
| LPN_3b | PPN_3b |
| LPN_3c | PPN_3c |
| ... | ... |
| LPN_3m | PPN_3m |

| LPN | PPN |
|---|---|
| LPN_1a | PPN_1a |
| LPN_1b | PPN_1b |
| LPN_1c | PPN_1c |
| ... | ... |
| LPN_1i | PPN_1i |
| ... | ... |
| LPN_1k | PPN_1k |
| ... | ... |
| LPN_1m | PPN_1m |

| LPN | PPN |
|---|---|
| LPN_2a | PPN_2a |
| LPN_2b | PPN_2b |
| LPN_2c | PPN_2c |
| ... | ... |
| LPN_2i | PPN_2i |
| ... | ... |
| LPN_2k | PPN_2k |

| LPN | PPN |
|---|---|
| LPN_3a | PPN_3a |
| LPN_3b | PPN_3b |
| LPN_3c | PPN_3c |
| ... | ... |
| LPN_3i | PPN_3i |

NON-VOLATILE MEMORY DEVICE INCLUDING SUB-BLOCKS HAVING DIFFERENT SIZES AND STORAGE DEVICE

CROSS-REFERENCE TO RELATED APPLICATION

This application is based on and claims priority to Korean Patent Application No. 10-2022-0155801, filed on Nov. 18, 2022, in the Korean Intellectual Property Office, the disclosure of which is incorporated by reference herein in its entirety.

BACKGROUND

The present disclosure relates to a memory device, and more particularly, to a non-volatile memory including sub-blocks having different sizes from each other, and a storage device including the non-volatile memory device.

As the number of word lines stacked on a substrate increases to meet demand for high capacity and miniaturization of non-volatile memory devices, sizes of memory blocks may also increase. As the sizes of the memory blocks increase, each of the memory blocks may be divided into at least two sub-blocks, and an erase operation may be performed in units of sub-blocks. In this case, when at least two sub-blocks are different in size, significant resources may be required to perform erase operations in units of sub-blocks, and complexity of management and firmware for performing garbage collection, wear leveling, or the like may increase, and accordingly, performance of the storage device may deteriorate.

SUMMARY

One or more example embodiments provide a non-volatile memory capable of improving the efficiency of an operation on a non-volatile memory including sub-blocks having different sizes, and a storage device capable of improving the efficiency of an operation on a non-volatile memory including sub-blocks having different sizes.

According to an aspect of an example embodiment, a non-volatile memory device includes: a plurality of sub-blocks provided on a substrate in a vertical direction. The plurality of sub-blocks includes: a first sub-block connected to a first word line group including a first number of word lines; and a second sub-block connected to a second word line group including a second number of word lines. The first sub-block includes: at least one first memory cell storing M-bit data; and a plurality of second memory cells each storing N-bit data. The second sub-block includes: at least one third memory cell storing K-bit data; and a plurality of fourth memory cells each storing L-bit data. M, N, K, and L are positive integers, N is greater than M, and L is greater than K. The first number and the second number are different, and the at least one first memory cell and the at least one third memory cell include different numbers of memory cells.

According to another aspect of an example embodiment, a storage device includes: a non-volatile memory including a first sub-block connected to a first word line group and a second sub-block connected to a second word line group, wherein the first word line group includes a first number of word lines, the second word line group includes a second number of word lines provided above the first word line group in a vertical direction; and a storage controller configured to manage a first mapping table corresponding to the first sub-block and a second mapping table corresponding to the second sub-block. The first sub-block includes at least one first memory cell, at least one first intermediate memory cell, and a plurality of second memory cells, wherein each of the plurality of second memory cells stores N-bit data, and a number of bits of data stored in at least one of the at least one first memory cell and the at least one first intermediate memory cell is less than N. The second sub-block includes at least one third memory cell and a plurality of fourth memory cells, wherein each of the plurality of fourth memory cells stores L-bit data, and a number of bits of data stored in the at least one third memory cell is less than L. N and L are positive integers greater than or equal to 2. The at least one first memory cell includes more memory cells than the at least one third memory cell.

According to another aspect of an example embodiment, a non-volatile memory device includes: a first memory stack including first memory cells respectively connected to first word lines stacked on a substrate in a vertical direction; and a second memory stack including second memory cells respectively connected to second word lines stacked in the vertical direction. The first word lines are provided between the substrate and the second word lines, and a second number of the second word lines is less than a first number of the first word lines. The first memory cells include at least one first memory cell, at least one first intermediate memory cell, and a plurality of second memory cells, each of the plurality of second memory cells storing N-bit data. The second memory cells include at least one third memory cell, at least one second intermediate memory cell, and a plurality of fourth memory cells, each of the plurality of fourth memory cells storing L-bit data. A number of bits of data stored in at least one of the at least one first memory cell and the at least one first intermediate memory cell is less than N. A number of bits of data stored in at least one of the at least one third memory cell and the at least one second intermediate memory cell is less than L. N and L are positive integers greater than or equal to 2. The at least one first memory cell includes a greater number of memory cells than the at least one third memory cell.

BRIEF DESCRIPTION OF DRAWINGS

Embodiments will be more clearly understood from the following description of example embodiments, taken in conjunction with the accompanying drawings, in which:

FIGS. 10A, 10B and 10C illustrate mapping tables respectively corresponding to a plurality of memory groups, according to example embodiments;

FIGS. 11A, 11B and 11C illustrate mapping tables respectively corresponding to a plurality of memory groups, according to example embodiments;

DETAILED DESCRIPTION

Figure 1:
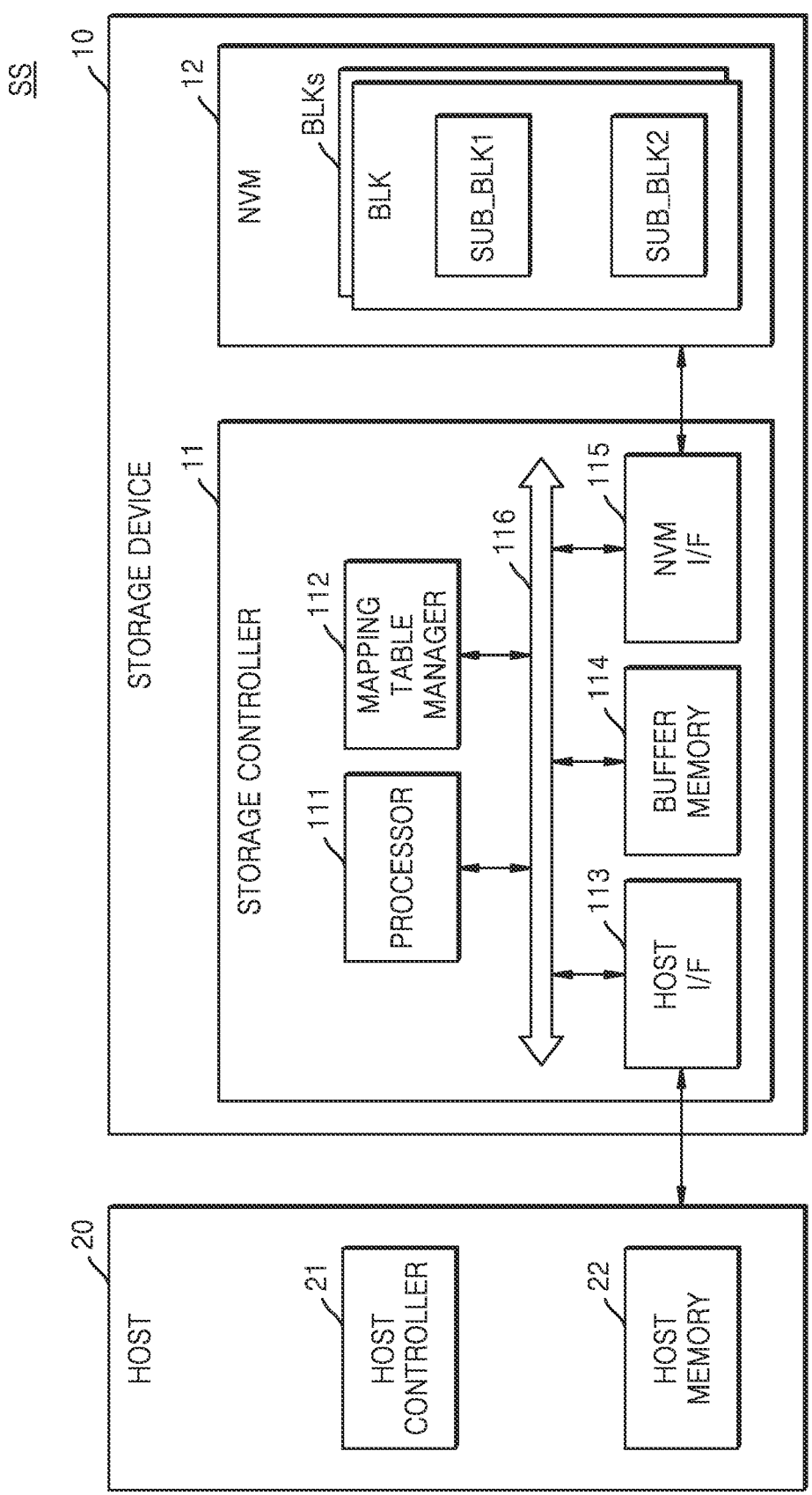
FIG. 1 is a block diagram of a storage system according to an example embodiment.

Hereinafter, example embodiments of the inventive concept are described in detail with reference to the accompanying drawings. The same or similar reference numerals may refer to the same elements throughout. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present.

FIG. 1 is a block diagram of a host-storage system SS according to an example embodiment.

Referring to FIG. 1, the host-storage system SS may include a storage device 10 and a host 20, and the storage device 10 may include a storage controller 11 and a non-volatile memory (NVM) 12. The storage controller 11 may be referred to as a memory controller or an NVM controller. The NVM 12 may include a plurality of blocks BLK, and each block BLK may include a plurality of sub-blocks having different block sizes. For example, the block size may correspond to the number of word lines connected to each sub-block. For example, the block size may correspond to a length in a vertical direction (e.g., VD in FIG. 4A) of each sub-block.

In an example embodiment, the plurality of sub-blocks may include a first sub-block SUB_BLK1 and a second sub-block SUB_BLK2. In an example embodiment, an erase operation on the NVM 12 may be performed in block units or sub-block units. For example, in a first mode, the erase operation may be performed independently on each of the plurality of blocks BLK, that is, the erase operation may be performed in block units. For example, in a second mode, the erase operation may be performed independently on each of the plurality of sub-blocks, that is, the erase operation may be performed in sub-block units. In this case, the amount of resources required for the erase operation of sub-blocks having different block sizes may be greater than the amount of resources required for the erase operation of sub-blocks having the same block size.

In an example embodiment, the first and second sub-blocks SUB_BLK1 and SUB_BLK2 may respectively correspond to first and second memory stacks (e.g., ST1 and ST2 in FIG. 6) arranged in the vertical direction on an upper portion of a substrate, and the block sizes thereof may respectively correspond to the stack sizes thereof. For example, the size of a first memory stack may correspond to the length in the vertical direction of the first memory stack, and the size of a second memory stack may correspond to the length in the vertical direction of the second memory stack. In an example embodiment, the erase operation on the NVM 12 may be performed in block units or in memory stack units. For example, in the first mode, the erase operation may be performed independently on each of the plurality of blocks BLK, that is, the erase operation may be performed in block units. For example, in the second mode, the erase operation may be performed independently on each of the plurality of memory stacks, that is, the erase operation may be performed in memory stack units. In this case, the amount of resources required for the erase operation on the memory stacks having different sizes may be greater than the amount of resources required for the erase operation on the memory stacks having the same size.

The storage controller 11 may communicate with the NVM 12, and may manage mapping tables for the first and second sub-blocks SUB_BLK1 and SUB_BLK2 of the NVM 12. The storage controller 11 may include a processor 111, a mapping table manager 112, a host interface (I/F) 113, a buffer memory 114, and a memory I/F (e.g., an NVM I/F) 115, which communicate with each other via a bus 116. Hereinafter, components of the storage controller 11 are described in detail.

The mapping table manager 112 may, by considering physical/electrical characteristics of the memory cells included in the first and second sub-blocks SUB_BLK1 and SUB_BLK2 having different sizes, determine differently data densities of memory cells included in the first sub-block SUB_BLK1, and may determine differently data densities of memory cells included in the second sub-block SUB_BLK2. In an example embodiment, the mapping table manager 112 may determine the data density of each of the memory cells included in the first and second sub-blocks SUB_BLK1 and SUB_BLK2 by using a pre-release characteristics check of the storage device 10. For example, the pre-release characteristics check may be performed as a part of a manufacturing operation. In an example embodiment, the mapping table manager 112 may determine dynamically the data density of each of the memory cells included in the first and second sub-blocks SUB_BLK1 and SUB_BLK2 by using a characteristics check result, a read result, or the like among operations of the storage device 10.

As used herein, "data density" may indicate the number of bits of data or information stored per memory cell. When N-bit data is stored per memory cell, the data density of the memory cell may be N (N is a positive integer). For example, because a single level cell (SLC) stores 1 bit of data per memory cell, the data density of the SLC may be 1. For example, because a multi-level cell (MLC) stores 2 bits of data per memory cell, the data density of the MLC may be 2. For example, because a triple-level cell (TLC) stores 3 bits of data per memory cell, the data density of the TLC may be 3. For example, because a quadruple-level cell (QLC) stores 4 bits of data per memory cell, the data density of the QLC may be 4. For example, because a penta-level cell (PLC) stores 5 bits of data per memory cell, the data density of the PLC may be 5.

In an example embodiment, the mapping table manager 112 may determine a memory cell having relatively low reliability according to physical/electrical characteristics, and may determine a memory cell having relatively high reliability according to physical/electrical characteristics. The mapping table manager 112 may determine a low density of the memory cell having the relatively low reliability, and may determine a high density of the memory cell having the relatively high reliability. For example, the storage controller 11 may, in each of the first and second sub-blocks SUB_BLK1 and SUB_BLK2, determine as the SLC or MLC, a memory cell having low reliability, such as a memory cell including a channel hole of a relatively small size, a memory cell including a charge storage layer (for example, an oxide-nitride-oxide (ONO) layer) having a relatively small thickness, and a memory cell including a channel hole having an irregular shape, and may determine a memory cell having high reliability as the TLC or QLC.

In an example embodiment, the mapping table manager 112 may perform an address mapping operation, so that the first sub-block SUB_BLK1 includes at least one first memory cell storing M-bit data, and a plurality of second memory cells each storing N-bit data, and the second sub-block SUB_BLK2 includes at least one third memory cell storing K-bit data, and a plurality of fourth memory cells each storing L-bit data. In this case, M, N, K, and L may be positive integers, N may be greater than M, and L may be greater than K. In an embodiment, a channel hole may extend through the at least one first memory cell, the plurality of second memory cells, the at least one third memory cell and the plurality of fourth memory cells, wherein the channel hole may be narrower at a first level corresponding to the at least one first memory cell than at a second level corresponding to the plurality of second memory cells, and the channel hole may be narrower at a third level corresponding to the at least one third memory cell than at a fourth level corresponding to the plurality of fourth memory cells. In an embodiment, a first thickness of a charge storage layer provided in the channel hole at a first level corresponding to the at least one first memory cell may be less than a second thickness of the charge storage layer at a second level corresponding to the plurality of second memory cells, and a third thickness of the charge storage layer at a third level corresponding to the at least one third memory cell may be less than a fourth thickness of the charge storage layer at a fourth level corresponding to the plurality of fourth memory cells.

In an example embodiment, the mapping table manager 112 may perform the address mapping operation so that the first sub-block SUB_BLK1 further includes at least one first intermediate memory cell which stores P-bit data and is arranged between at least one first memory cell and a plurality of second memory cells, wherein P may be a positive integer equal to or greater than M and less than N. In an example embodiment, the mapping table manager 112 may perform the address mapping operation so that the second sub-block SUB_BLK2 further includes at least one second intermediate memory cell which stores P-bit data and is arranged between at least one third memory cell and the plurality of fourth memory cells, wherein P may be a positive integer equal to or greater than K and less than L. In an embodiment, the first sub-block SUB_BLK1 may be grouped into a first group and a second group which are independently erasable, and the at least one first intermediate memory cell may be adjacent to an interface between the first group and the second group.

In an example embodiment, the plurality of sub-blocks may further include a third sub-block, the mapping table manager 112 may perform the address mapping operation so that the third sub-block includes at least one third lower memory cell, at least one third intermediate memory cell, and a plurality of third upper memory cells each storing L-bit data, and the number of bits of data stored in at least one of at least one third lower memory cell and at least one third intermediate memory cell is less than L.

In an example embodiment, the mapping table manager 112 may manage a first mapping table corresponding to the first sub-block SUB_BLK1 (for example, MT1a in FIG. 10A) and a second mapping table corresponding to the second sub-block SUB_BLK2 (for example, MT2a in FIG. 10B), so that logical sizes of the first and second sub-blocks SUB_BLK1 and SUB_BLK2 are the same. The mapping table manager 112 may, during the address mapping operation, map the same amount of logical data to the first and second sub-blocks SUB_BLK1 and SUB_BLK2. In a logical-to-physical (L2P) mapping operation for mapping a logical address received from the host 20, for example, a logical page number, to a physical address of the NVM 12, for example, a physical page number, the mapping table manager 112 may perform the L2P mapping operation so that the number of logical page numbers assigned to a first mapping table is the same as the number of logical page numbers assigned to a second mapping table.

In an example embodiment, the mapping table manager 112 may perform the address mapping operation so that the number of logical addresses corresponding to the first sub-block SUB_BLK1 is the same as the number of logical addresses corresponding to the second sub-block SUB_BLK2. In an example embodiment, the mapping table manager 112 may perform the address mapping operation so that the number of logical addresses corresponding to the first sub-block SUB_BLK1 is different from the number of logical addresses corresponding to the second sub-block SUB_BLK2. In an example embodiment, the number of physical addresses corresponding to the first sub-block SUB_BLK1 may be different from the number of physical addresses corresponding to the second sub-block SUB_BLK2. However, example embodiments are not limited thereto, and in an example embodiment, the number of physical addresses corresponding to the first sub-block SUB_BLK1 may be the same as the number of physical addresses corresponding to the second sub-block SUB_BLK2.

According to an example embodiment, the mapping table manager 112 may be implemented as software, firmware, and/or hardware. In an example embodiment, the mapping table manager 112 may be implemented as software, the storage controller 11 may further include a working memory, in which the mapping table manager 112 is loaded, and the processor 111 may control the address mapping operation on the NVM 12 by executing the mapping table manager 112. For example, the working memory may be implemented as a volatile memory, such as static RAM (SRAM) and dynamic RAM (DRAM), or as an NVM, such as a flash memory and phase change RAM (PRAM).

In an example embodiment, the mapping table manager 112 may be implemented in a flash translation layer (FTL), and the processor 111 may control the address mapping operation on the NVM 12 by executing the FTL. In this case, data write and read operations on the NVM 12 may also be controlled by the processor 111 executing the FTL. In addition, the FTL may perform various functions, such as wear-leveling and garbage collection. The wear-leveling may be a technique to prevent excessive degradation of particular blocks by allowing blocks in the NVM 12 to be used uniformly, and for example, may be implemented by using firmware technology that balances erase counts of physical blocks. The garbage collection may be a technique that, to secure available capacity in the NVM 12, a victim sub-block among a plurality of sub-blocks of the NVM 12 is selected, effective data of the victim sub-block is copied to a new sub-block, that is, to a target sub-block, and then, the victim sub-block is erased.

The processor 111 may include a central processing unit (CPU), a microprocessor, or the like, and may control the overall operation of the storage controller 11. In an example embodiment, the processor 111 may be implemented as a multi core processor, for example, a dual core processor or a quad core processor. The buffer memory 114 may temporarily store data to be recorded in the NVM 12 or data to be read from the NVM 12. The buffer memory 114 may be a component arranged in the storage controller 11, or may be arranged outside the storage controller 11. For example, the storage controller 11 may further include a buffer memory manager or a buffer memory interface for communicating with the buffer memory 114.

The host I/F 113 may transceive packets to and from the host 20. A packet transmitted from the host 20 to the host I/F 113 may include a command, data to be recorded in the NVM 12, or the like, and a packet transmitted from the host I/F 113 to the host 20 may include a response to the command, data read from the NVM 12, etc. The NVM I/F 115 may transmit data to be stored in the NVM 12 to the NVM 12 or receive data read from the NVM 12. The memory I/F 115 may be implemented to comply with standard conventions, such as a toggle or an open NAND flash interface (ONFI).

The storage device 10 may include storage media for storing data according to a request from the host 20. For example, the storage device 10 may include at least one of a solid-state drive (SSD), an embedded memory, and a removable external memory. When the storage device 10 includes an SSD, the storage device 10 may include a device complying with an NVM express (NVMe) standard. When the storage device 10 includes an embedded memory or an external memory, the storage device 10 may include a device complying with a universal flash storage (UFS) or the embedded multi-media card (eMMC) standard. The host 20 and the storage device 10 may each generate and transmit packets according to the adopted standard protocols.

In an example embodiment, the host 20 may include a host controller 21 and a host memory 22. The host controller 21 may manage an operation of storing, in the NVM 12, data in a buffer region of the host memory 22, or storing data of the NVM 12 in the buffer region of the host memory 22. The host memory 22 may function as a buffer memory for temporarily storing data to be transmitted to the storage device 10, or data transmitted by the storage device 10. As an example, the host controller 21 may include any one of a plurality of modules provided in an application processor, and the application processor may be implemented as a system on chip (SoC). In addition, the host memory 22 may include an embedded memory provided in the application processor, or an NVM or a memory module arranged outside the application processor.

Figure 2:
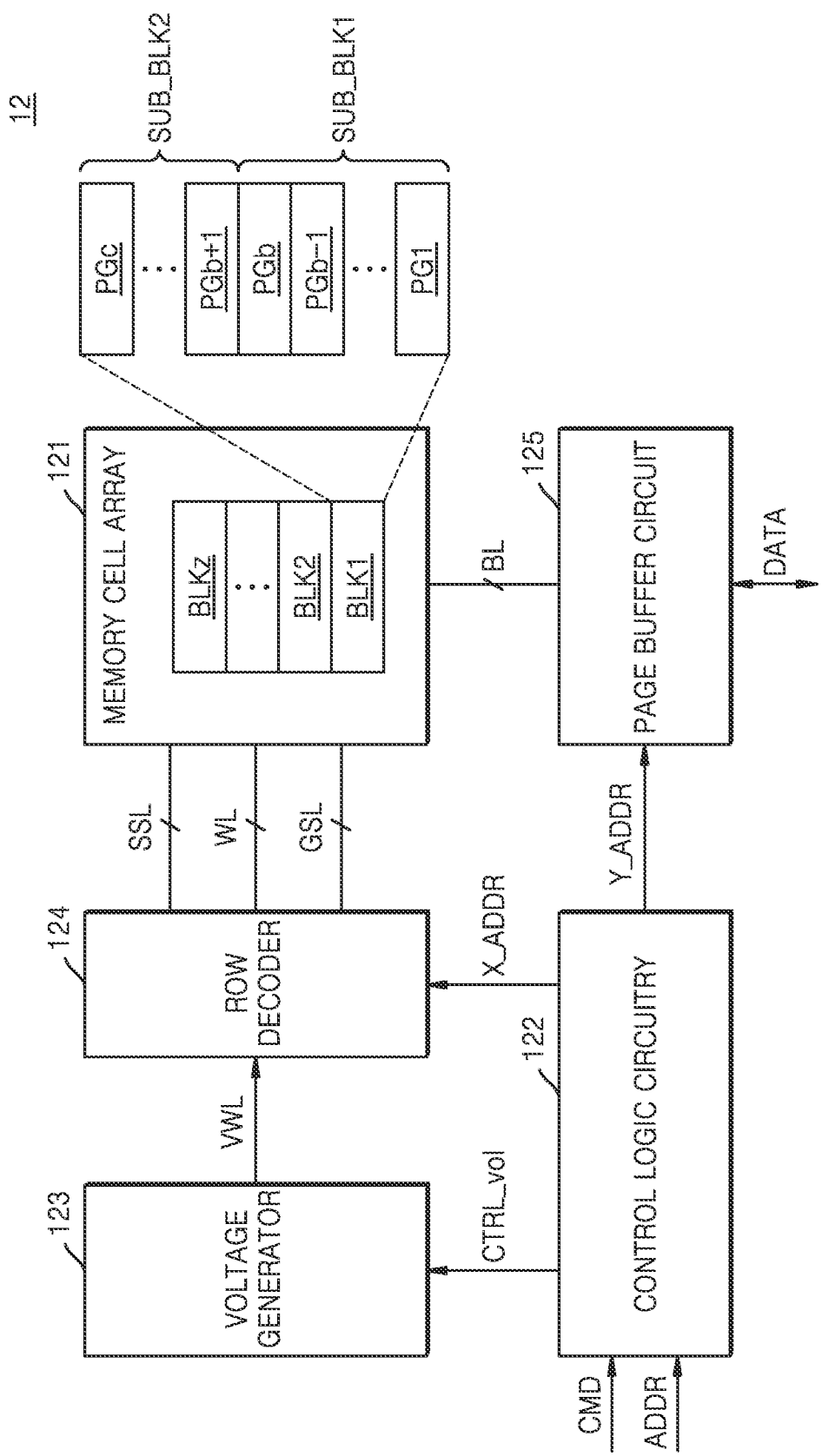
FIG. 2 is a block diagram of a non-volatile memory according to an example embodiment.

FIG. 2 is a block diagram of the NVM 12 according to an example embodiment. Referring to FIG. 2, the NVM 12 may include a memory cell array 121, control logic circuitry 122, a voltage generator 123, a row decoder 124, and a page buffer circuit 125. The NVM 12 may correspond to an illustrated example of the NVM 12 in FIG. 1.

The memory cell array 121 may include a plurality of memory blocks BLK1 through BLKz, each of the plurality of memory blocks BLK1 through BLKz may include a plurality of pages PG1 through PGc, z and c may be positive integers, and may be variously changed according to example embodiments. For example, some pages PG1 through PGb among the plurality of pages PG1 through PGc may be included in the first sub-block SUB_BLK1, the remaining pages PGb+1 through PBc may be included in the second sub-block SUB_BLK2, and b may be a positive integer less than c. For example, a memory block or sub-block may be a unit of an erase operation, and a page may be a unit of a program operation and a read operation. The memory cell array 121 may be connected to the page buffer circuit 125 via bit lines BL, and may be connected to the row decoder 124 via word lines WL, string selection lines SSL, and ground selection lines GSL.

In an example embodiment, the memory cell array 121 may include a three-dimensional (3D) memory cell array, and the 3D memory cell array may include a plurality of NAND strings. Each NAND string may include memory cells respectively connected to word lines WL vertically stacked on a substrate. U.S. Pat. Nos. 7,679,133, 8,553,466, 8,654,587, 8,559,235, and U.S. Patent Application Publication No. 2011/0233648 are incorporated herein in their entirety by reference.

In an example embodiment, the memory cell array 121 may include a flash memory, and the flash memory may include a two-dimensional (2D) NAND memory array or a 3D vertical NAND (VNAND) memory array. In an example embodiment, the storage device 10 may also include other types of NVMs. For example, the memory cell array 121 may include magnetic RAM (MRAM), spin-transfer torque MRAM, conductive bridging RAM (CBRAM), ferroelectric RAM (FeRAM), phase change RAM (PRAM), resistive RAM (RRAM), and other types of memories.

The control logic circuitry 122 may control various operations in the NVM 12. The control logic circuitry 122 may output various control signals according to a command CMD and/or an address ADDR. For example, the control logic circuitry 122 may output a voltage control signal CTRL_vol, a row address X_ADDR, and a column address Y_ADDR. The voltage generator 123 may generate various types of voltages for performing program, read, and erase operations based on the voltage control signal CTRL_vol. For example, the voltage generator 123 may, as a word line voltage VWL, generate a program voltage, a read voltage, a program verification voltage, an erase voltage, etc.

The row decoder 124 may select one of the plurality of word lines WL according to the row address X_ADDR, and may select one of the plurality of string selection lines SSL. For example, during the program operation, the row decoder 124 may apply the program voltage and the program verification voltage to the selected word line WL, and during the read operation, may apply the read voltage to the selected word line WL. The page buffer circuit 125 may select at least one bit line BL among the bit lines BL according to the column address Y_ADDR. The page buffer circuit 125 may operate as a write driver or a sense amplifier according to an operation mode. For example, the page buffer circuit 125 may receive or transmit data DATA.

Figure 3:
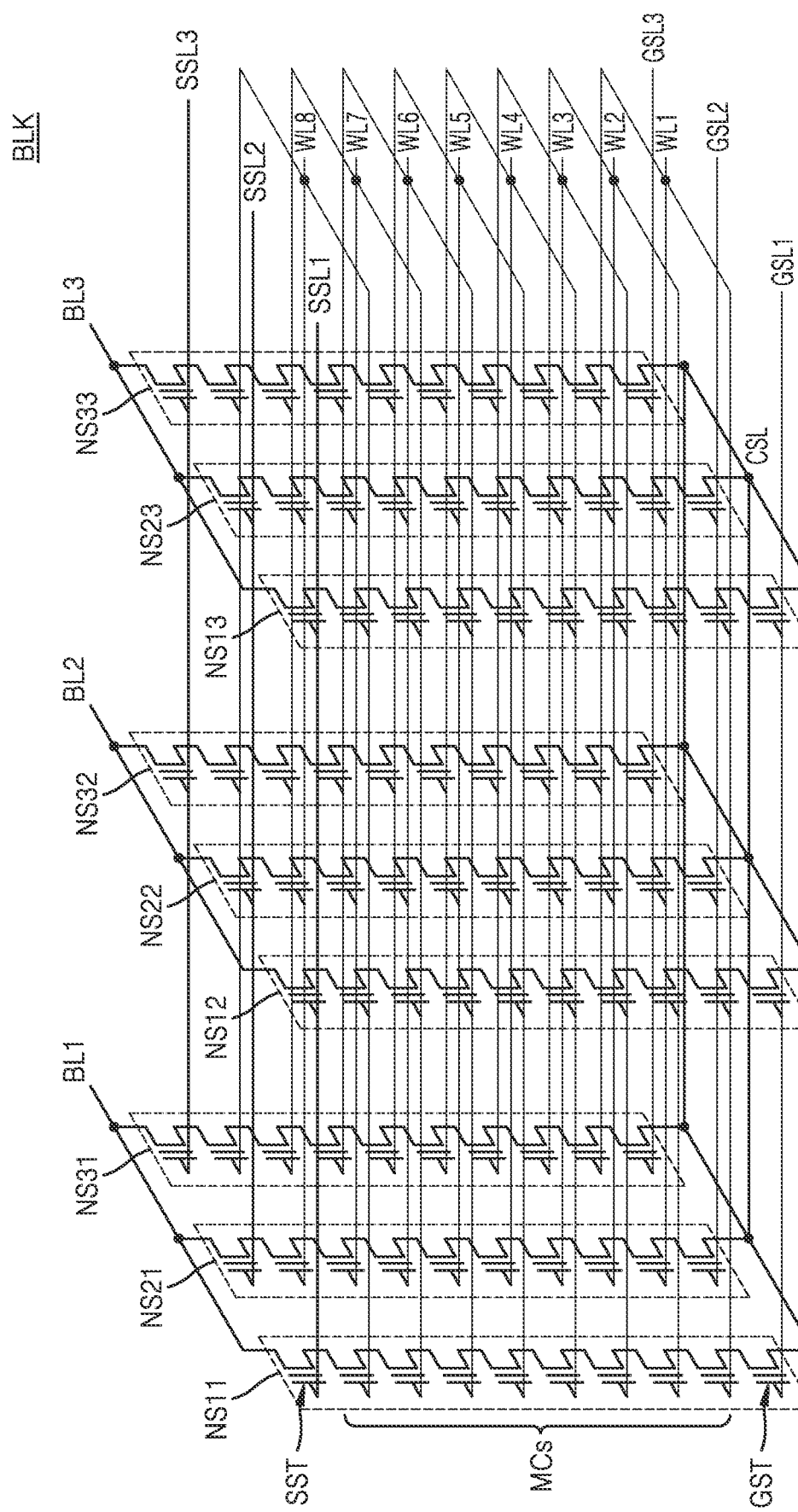
FIG. 3 illustrates a circuit diagram of a memory block according to an example embodiment.

FIG. 3 illustrates a circuit diagram of a memory block BLK according to an example embodiment.

Referring to FIG. 3, the memory block BLK may correspond to one of the plurality of memory blocks BLK1 through BLKz in FIG. 2. The memory block BLK may include NAND strings NS11 through NS33, and each NAND string (for example, NS11) may include a string selection transistor SST, a plurality of memory cells MCs, and a ground selection transistor GST, which are connected to each other in series. The string selection transistor SST, the ground selection transistor GST, and the memory cells MC, which are included in each NAND string, may form a structure stacked in a vertical direction on a substrate.

First through third bit lines BL1 through BL3 may extend in a first direction, and word lines WL1 through WL8 may extend in a second direction. The NAND strings NS11, NS21, and NS31 may be between the first bit line BL1 and the common source line CSL, the NAND strings NS12, NS22, and NS32 may be between the second bit line BL2 and the common source line CSL, and the NAND strings NS13, NS23, and NS33 may be between the third bit line BL3 and the common source line CSL.

The string selection transistor SST may be connected to a corresponding string selection line among string selection lines SSL1 through SSL3. The memory cells MCs may respectively be connected to corresponding word lines WL1 through WL8. The ground selection transistor GST may be connected to a corresponding ground selection line among ground selection lines GSL1 through GSL3. The string selection transistor SST may be connected to the corresponding bit lines BL1 through BL3, and the ground selection transistor GST may be connected to the common source line CSL. In this case, the number of NAND strings, the number of word lines WL, the number of bit lines BL, the number of ground selection lines GSL, and the number of string selection lines SSL may be variously changed according to an example embodiment.

Figure 4A:
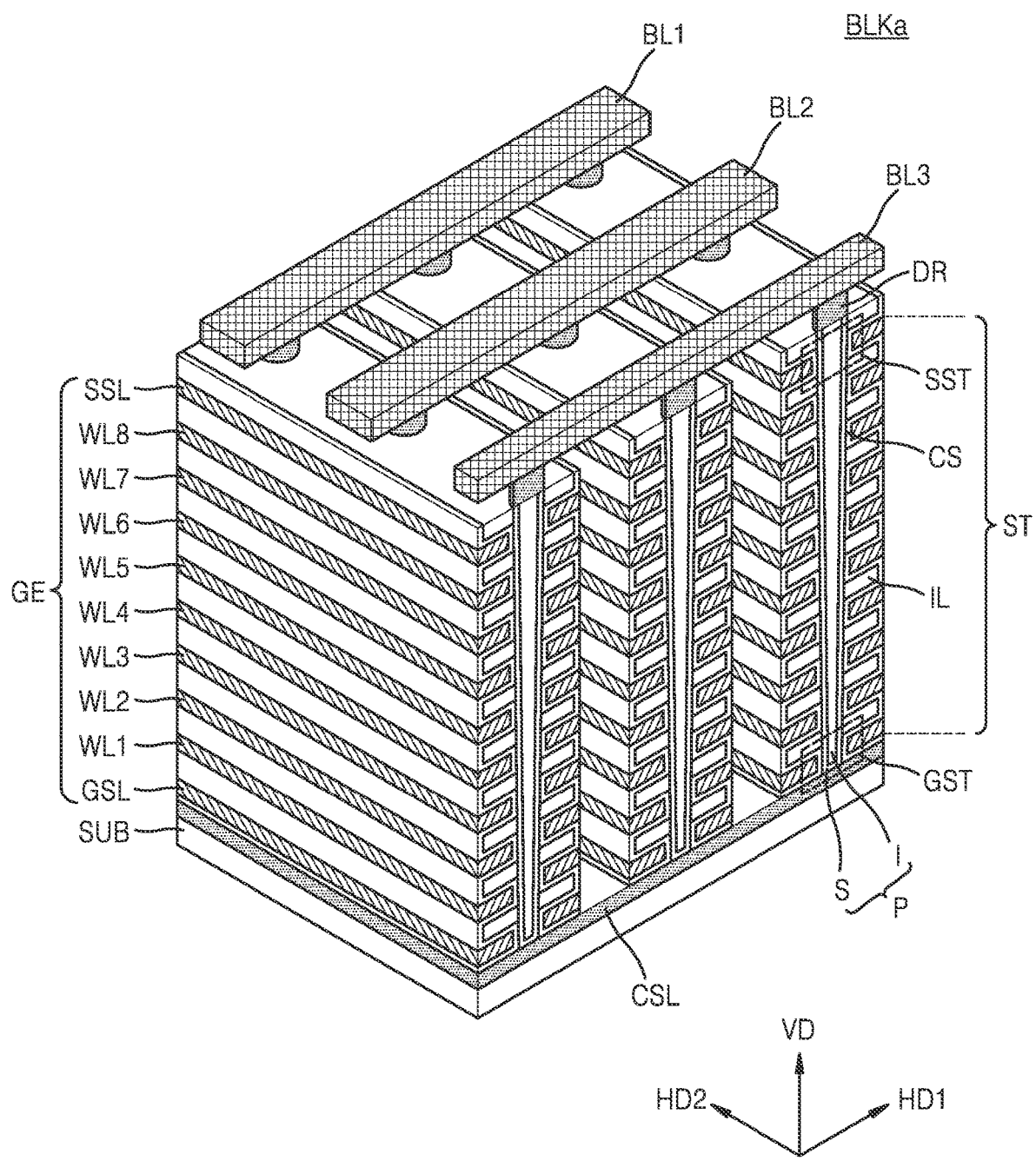
FIGS. 4A and 4B illustrate perspective views of memory blocks according to example embodiments.

FIG. 4A is a perspective view of a memory block BLKa according to an example embodiment.

Referring to FIG. 4A, the memory block BLKa may correspond to one of the plurality of memory blocks BLK1 through BLKz in FIG. 2. The memory block BLKa may include a memory stack ST extending in a vertical direction VD on an upper portion of a substrate SUB. For example, the memory block BLKa may include one memory stack ST between the substrate SUB and the bit lines BL1 through BL3. The common source lines CSL may be arranged on the substrate SUB, and insulating layers IL extending in a second horizontal direction HD2 may be sequentially provided in the vertical direction VD above regions of the substrate SUB between two adjacent common source lines CSL, and may be apart by a particular distance in the vertical direction VD. Pillars P penetrating the insulating layers IL in the vertical direction VD may be provided on the regions of the substrate SUB between two adjacent common source lines CSL. A surface layer S of each pillar P may include a silicon material of a first type, and may function as a channel region. On the other hand, an inner layer I of each pillar P may include an insulating material, such as silicon oxide or an air gap.

Above the region between two adjacent common source lines CSL, a charge storage layer CS may be provided along exposed surfaces of the insulating layers IL, the pillars P, and the substrate SUB. The charge storage layer CS may include a gate insulating layer, a charge trap layer, and a blocking insulating layer. For example, the charge storage layer CS may have an ONO structure (e.g., an ONO layer). In addition, in a region between two adjacent common source lines CSL, and on an exposed surface of the charge storage layer CS, a gate electrode GE including the ground selection line GSL, the string selection line SSL, and the word lines WL1 through WL8 may be provided. Drains DR may be respectively provided on a plurality of pillars P. On the drains DR, the bit lines BL1 through BL3 extending in a first horizontal direction HD1 and arranged apart from each other by a particular distance in the second horizontal direction HD2 may be provided.

Figure 4B:
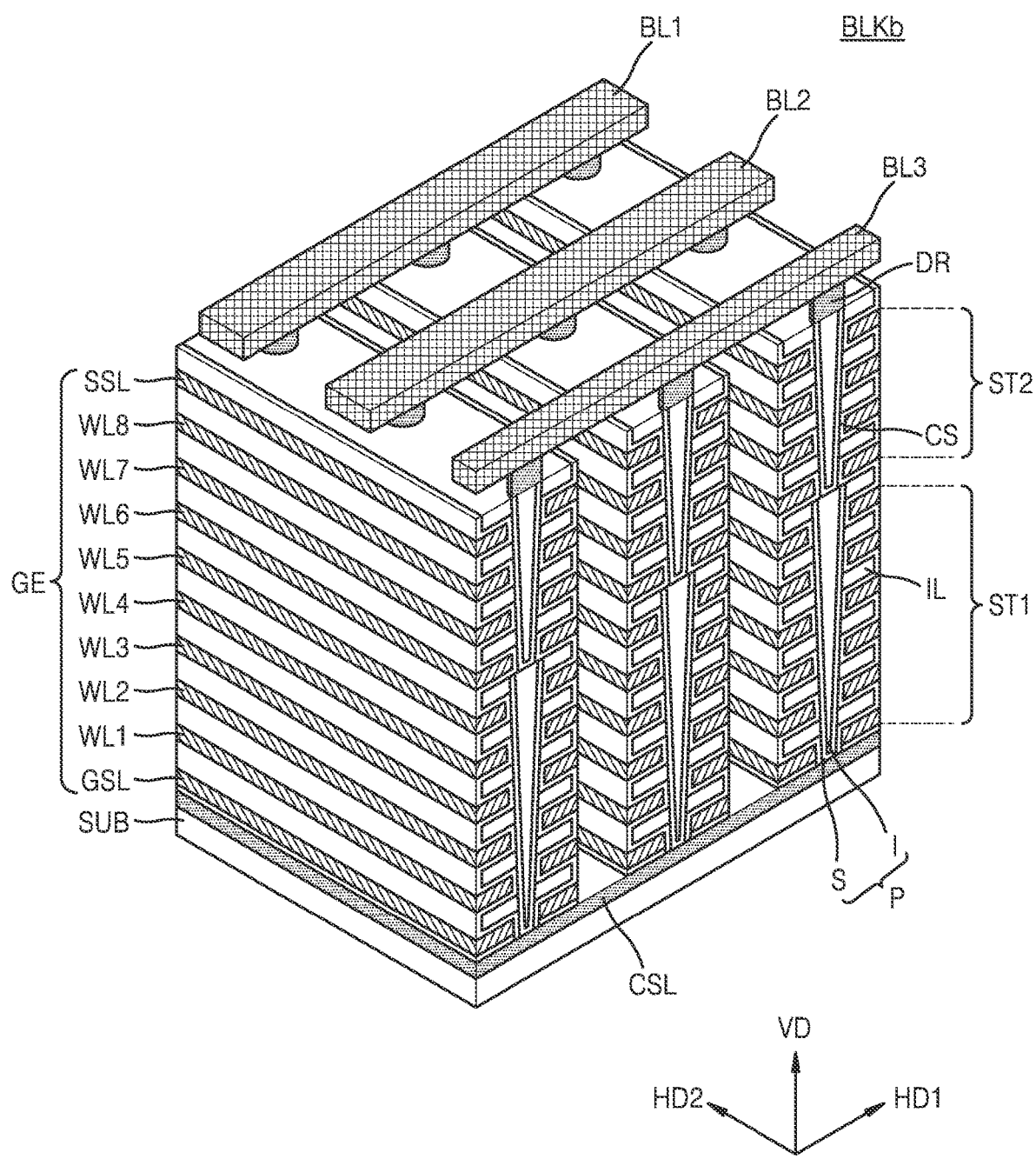

FIG. 4B illustrates a perspective view of a memory block BLKb according to an example embodiment.

Referring to FIG. 4B, the memory block BLKb may correspond to one of the plurality of memory blocks BLK1 through BLKz in FIG. 2. In addition, the memory block BLKb may correspond to a modified example of the memory block BLKa of FIG. 4A, and descriptions given above with reference to FIG. 4A may also be applied to the following description. The memory block BLKb may include a first memory stack ST1 and a second memory stack ST2, which are stacked in the vertical direction VD on an upper portion of the substrate SUB. For example, the memory block BLKb may include two memory stacks, that is, the first and second memory stacks ST1 and ST2, between the substrate SUB and the bit lines BL1 through BL3, and accordingly, may have a multi stack structure, for example, a 2-stack structure. In this case, lengths of the first and second memory stacks ST1 and ST2 in the vertical direction VD may be different from each other. However, example embodiments are not limited thereto, and according to an example embodiment, a memory block may include three or more memory stacks between the substrate SUB and the bit lines BL1 through BL3.

Figure 5:
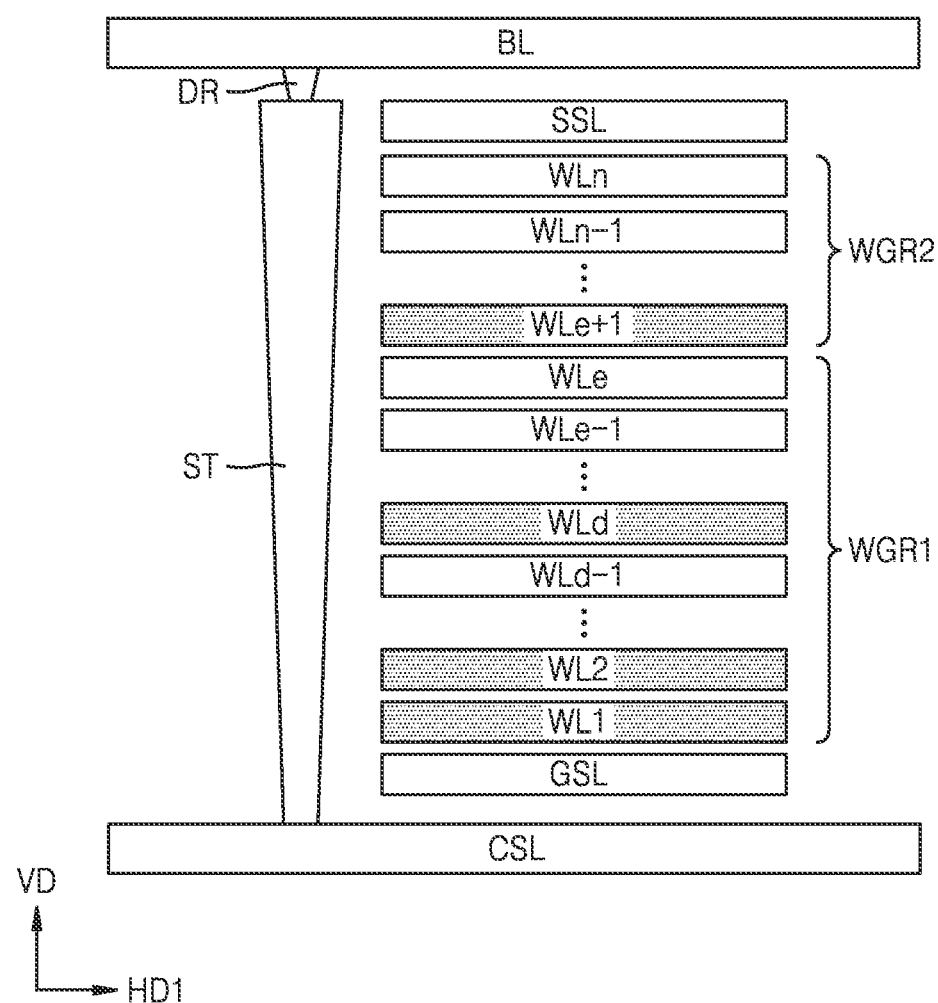
FIGS. 5 through 8 schematically illustrate non-volatile memories according to example embodiments.

FIG. 5 illustrates an NVM 50 according to an example embodiment.

Referring to FIG. 5, the NVM 50 may include the common source line CSL and the bit line BL extending in the first horizontal direction HD1, and may include the memory stack ST extending in the vertical direction VD. In this case, the memory stack ST may be connected to the bit line BL via the drain DR. For example, the NVM 50 may correspond to an example of FIG. 4A, and the memory stack ST may correspond to the pillar P in FIG. 4A and the cell string NS11 in FIG. 3.

The NVM 50 may further include a plurality of word lines WL1 through WLn stacked in the vertical direction VD, include at least one ground selection line GSL arranged between the common source line CSL and the word line WL1, and include at least one string selection line SSL arranged between the bit line BL and the word line WLn. An erase control line (for example, a first gate induced drain leakage (GIDL) control line) may be further arranged between the string selection line SSL and the bit line BL, and an erase control line (for example, a second GIDL control line) may be further arranged between the ground selection line GSL and the common source line CSL.

With the development of process technology, the number of word lines WL1 through WLn may increase, and accordingly, the size and shape of the channel hole in the memory stack ST may be uneven in the vertical direction VD, and the thickness of the charge storage layer, that is, the ONO layer, in the memory stack ST may be uneven in the vertical direction VD. For example, the size of the channel hole connected to the word line WL1 on a lower portion may be less than the size of the channel hole connected to the word line WLn on an upper portion. For example, the thickness of the ONO layer connected to the word line WL1 on the lower portion may be less than the thickness of the ONO layer connected to the word line WLn on the upper portion.

In an example embodiment, the plurality of word lines WL1 through WLn may be grouped into a plurality of groups including a first word line group WGR1 and a second word line group WGR2. The first word line group WGR1 may include word lines WL1 through WLe relatively close to the substrate SUB, and the second word line group WGR2 may include word lines WLe+1 through WLn relatively far from the substrate SUB. The word lines WL1 through WLe may include word lines WL1 through WLd−1 and word lines WLd through WLe. In this case, e is a positive integer between 1 and n, and d is a positive integer less than e. According to example embodiments, a plurality of word lines WL1 through WLn may be grouped into three or more groups. In an example embodiment, the number of word lines included in the first word line group WGR1 may be different from the number of word lines included in the second word line group WGR2. For example, the number of word lines included in the first word line group WGR1 may be greater than the number of word lines included in the second word line group WGR2. In this regard, e may be greater than n/2.

Referring to FIGS. 1 and 5 together, the word lines WL1 through WLe included in the first word line group WGR1 may be connected to the first sub-block SUB_BLK1, and the word lines WLe+1 through WLn included in the second word line group WGR2 may be connected to the second sub-block SUB_BLK2. In this case, the block size of the first sub-block SUB_BLK1 may correspond to the number of word lines WL1 through WLe included in the first word line group WGR1, and the block size of the second sub-block SUB_BLK2 may correspond to the number of word lines WLe+1 through WLn included in the second word line group WGR2. In this manner, the first and second sub-blocks SUB_BLK1 and SUB_BLK2 may have different block sizes from each other. According to an example embodiment, sizes of the first and second word line groups WGR1 and WGR2 may be dynamically changed, and accordingly, block sizes of the first and second sub-blocks SUB_BLK1 and SUB_BLK2 may also be dynamically changed. In this regard, the block sizes of the first and second sub-blocks SUB_BLK1 and SUB_BLK2 may be changed during the runtime of the storage device 10.

The storage controller 11 may determine differently data densities of the memory cells included in the first sub-block SUB_BLK1. In an example embodiment, the storage controller 11 may determine, as the SLCs or MLCs, lower memory cells each connected to the word lines WL1 and WL2 at the lower portion of the first word line group WGR1, and may determine, as the TLCs or QLCs, memory cells respectively connected to the remaining word lines WLd−1, WLe−1, and WLe of the first word line group WGR1. In this case, the number of lower memory cells, in which the data density is determined to be relatively low, in the first sub-block SUB_BLK1 may be variously changed according to an example embodiment. In some example embodiments, the number of lower memory cells determined as the SLCs or MLCs in the first sub-block SUB_BLK1 may also be 1.

As the length in the vertical direction VD of the memory stack ST increases, the diameter of a lower channel hole may be less than the diameter of an upper channel hole, and accordingly, the reliability of the lower memory cells corresponding to the lower channel hole may be relatively low. In addition, a voltage applied to the ground selection line GSL or the common source line CSL adjacent to the lower memory cells may be different from a voltage applied to the word lines WL1 and WL2 at the lower portion each connected to the lower memory cells, and accordingly, the lower memory cells may be less reliable than the upper memory cells. According to example embodiments, the number of bits of data stored in each of the lower memory cells having relatively low reliability may be determined to be relatively less. As a result, the reliability of the lower memory cells of the memory stack ST may be improved.

In an example embodiment, the storage controller 11 may determine, as the SLC or MLC, an intermediate memory cell connected to the word line WLd at an intermediate portion of the first word line group WGR1. For example, when striation, dimple, chipping, or the like occurs in a channel hole corresponding to the intermediate memory cell, the intermediate memory cell may have relatively low reliability. According to example embodiments, the number of bits of data stored in each of the intermediate memory cells having relatively low reliability may be determined to be relatively less. For example, prior to the release of the product, by performing an electrical/physical characteristics inspection of the NVM 12, an intermediate memory cell determined as the SLC or MLC may be selected in advance. In addition, for example, after the release of the product, an intermediate memory cell determined as the SLC or MLC may be dynamically determined or changed according to the operating characteristics of the NVM 12.

Similarly, the storage controller 11 may determine differently the number of bits of data stored in each of a plurality of memory cells included in the second sub-block SUB_BLK2. For example, when an erase operation is performed on the first sub-block SUB_BLK1, the reliability of a lower memory cell connected to a word line WLe+1 at a lower portion adjacent to the first sub-block SUB_BLK1, among the word lines WLe+1 through WLn of the second word line group WGR2 may deteriorate. In an example embodiment, the storage controller 11 may determine, as the SLCs or MLCs, lower memory cells connected to the word line WLe+1 at the lower portion of the second word line group WGR2, and may determine, as the TLCs or QLCs, memory cells each connected to the remaining word lines WLn−1 and WLn of the second word line group WGR2. In this case, the number of lower memory cells, in which the data density is determined to be relatively low, in the second sub-block SUB_BLK2 may be variously changed according to an example embodiment. In some example embodiments, the number of lower memory cells determined as the SLCs or MLCs in the second sub-block SUB_BLK2 may also be 1.

Figure 6:
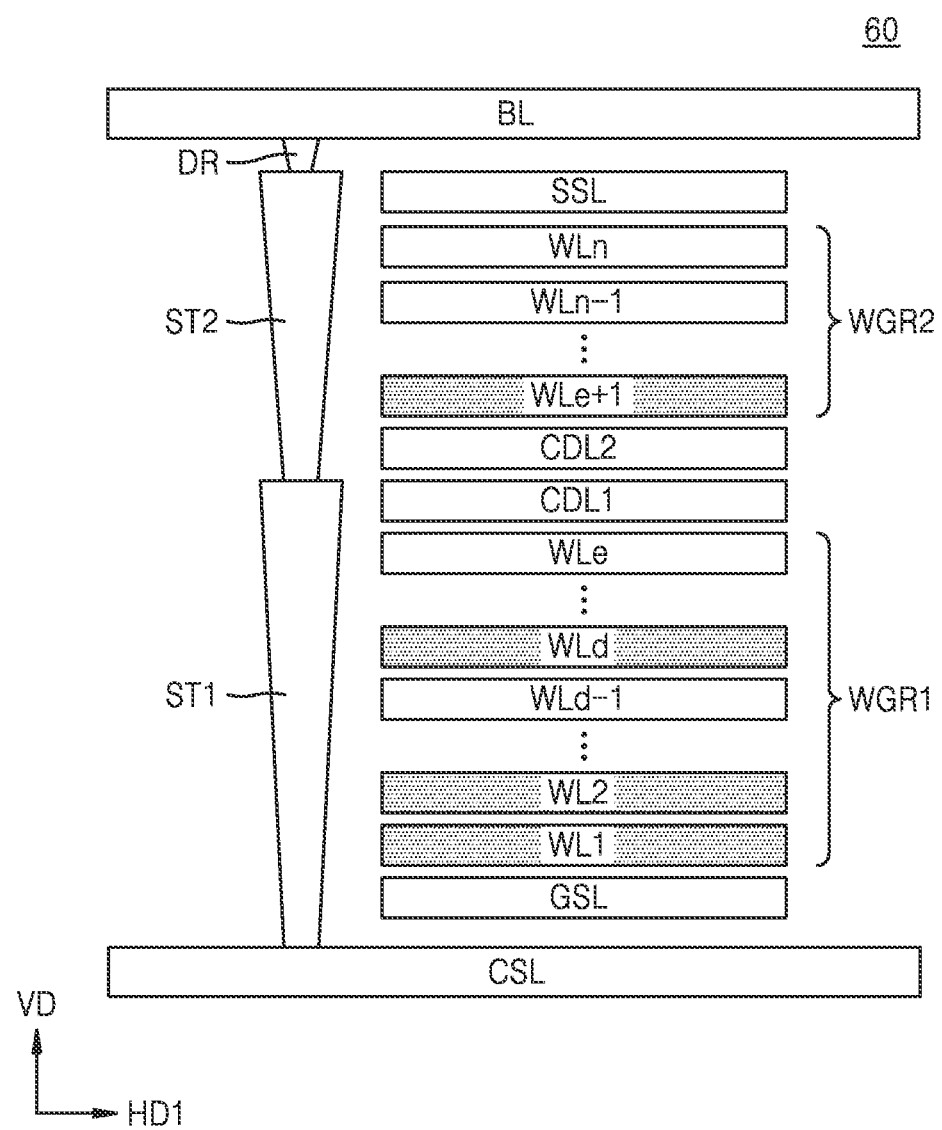

FIG. 6 illustrates an NVM 60 according to an example embodiment.

Referring to FIG. 6, the NVM 60 may include the common source line CSL and the bit line BL extending in the first horizontal direction HD1, and may include the first memory stack ST1 and the second memory stack ST2 extending in the vertical direction VD. In this case, the first memory stack ST1 may be arranged on the common source line CSL, and the second memory stack ST2 may be arranged on the first memory stack ST1 and connected to the bit line BL via the drain DR. For example, the NVM 60 may correspond to an example of FIG. 4B, and the first memory stack ST1 and the second memory stack ST2 may correspond to the first memory stack ST1 and the second memory stack ST2 in FIG. 4B, respectively.

In addition, the NVM 60 may correspond to a modified example of the NVM 50 of FIG. 5, and thus, duplicate descriptions thereof are omitted. The NVM 60 may further include a first center dummy word line CDL1 and a second center dummy word line CDL2 corresponding to a junction portion of the first memory stack ST1 and the second memory stack ST2. However, example embodiments are not limited thereto, and the number of center dummy word lines corresponding to the junction portion may be variously changed according to an example embodiment. In addition, according to an example embodiment, the center dummy word lines may be omitted.

To further increase the number of word lines WL1 through WLn stacked on the substrate SUB, a plurality of channel holes may be sequentially formed in the substrate SUB. For example, a first channel hole formed in the substrate may correspond to the first memory stack ST1, and a second channel hole formed in the first channel hole may correspond to the second memory stack ST2. Accordingly, the size and shape of the channel hole in each of the first and second memory stacks ST1 and ST2 may be uneven in the vertical direction VD, and the thickness of the charge storage layer, that is, the ONO layer, may be uneven in the vertical direction VD in each of the first and second memory stacks ST1 and ST2.

For example, in the first memory stack ST1, the size of the channel hole connected to the word line WL1 at the lower portion may be less than the size of the channel hole connected to the word line WLe at the upper portion, and similarly, in the second memory stack ST2, the size of the channel hole connected to the word line WLe+1 at the lower portion may be less than the size of the channel hole connected to the word line WLn at the upper portion. For example, in the first memory stack ST1, the thickness of the ONO layer connected to the word line WL1 at the lower portion may be less than the thickness of the ONO layer connected to the word line WLe at the upper portion, and similarly, in the second memory stack ST2, the thickness of the ONO layer connected to the word line WLe+1 at the lower portion may be less than the thickness of the ONO layer connected to the word line WLn at the upper portion.

In an example embodiment, the first memory stack ST1 may be connected to the first word line group WGR1, and the second memory stack ST2 may be connected to the second word line group WGR2. The first word line group WGR1 may include a first number of word lines WL1 through WLe, and the second word line group WGR2 may include a second number of word lines WLe+1 through WLn, different from the first number. For example, the first number may be greater than the second number. In some example embodiments, word lines connected to the first memory stack ST1 may be grouped into a plurality of groups, word lines connected to the second memory stack ST2 may also be grouped into a plurality of groups, and an erase operation may be independently performed for each group.

Referring to FIGS. 1 and 6 together, the word lines WL1 through WLe included in the first word line group WGR1 may be connected to the first sub-block SUB_BLK1, and the word lines WLe+1 through WLn included in the second word line group WGR2 may be connected to the second sub-block SUB_BLK2. The storage controller 11 may determine differently data densities of the memory cells included in at least one of the first and second sub-blocks SUB_BLK1 and SUB_BLK2.

In an example embodiment, the storage controller 11 may determine, as the SLCs or MLCs, lower memory cells each connected to the word lines WL1 and WL2 at the lower portion of the first word line group WGR1, may determine, as the SLC or MLC, the intermediate memory cell connected to the word line WLd at an intermediate portion of the first word line group WGR1, and may determine, as the TLCs or QLCs, memory cells each connected to the remaining word lines WLd−1, WLe−1, and WLe of the first word line group WGR1.

In each of the first and second memory stacks ST1 and ST2, the diameter of a lower channel hole may be less than the diameter of an upper channel hole, and in addition, the thickness of a charge storage layer corresponding to the lower channel hole may be less than the thickness of the charge storage layer corresponding to the upper channel hole, and accordingly, the lower memory cells correspond-ing to the lower channel hole may have lower reliability than the upper memory cells corresponding to the upper channel hole. According to example embodiments, in each of the first and second memory stacks ST1 and ST2, the number of bits of data stored in each of the lower memory cells arranged in an edge region may be determined to be relatively small. Accordingly, the reliability of the lower memory cells of each of the first and second memory stacks ST1 and ST2 may be improved.

In addition, in at least one of the first and second memory stacks ST1 and ST2, a striation layer, a chipping layer, a dimple layer, or the like may be generated in some regions of the intermediate channel hole. As a result, an intermediate memory cell corresponding to an intermediate channel hole may have at least one of a channel hole size, a channel hole shape, and a charge storage layer thickness different from other memory cells, and accordingly, the intermediate memory cell corresponding to the intermediate channel hole may have lower reliability than other memory cells. According to example embodiments, in at least one of the first and second memory stacks ST1 and ST2, the number of bits of data stored in the intermediate memory cell may be determined to be relatively small. As a result, reliability of at least one intermediate memory cell of the first and second memory stacks ST1 and ST2 may be improved.

In addition, in each of the first and second memory stacks ST1 and ST2, the number of bits of data stored in at least one memory cell adjacent to an interface between the first and second memory stacks ST1 and ST2 may be determined to be relatively small. Furthermore, in the second memory stack ST2, the number of bits of data stored in at least one memory cell adjacent to the bit line BL may also be determined to be relatively small. As a result, the reliability of the memory cells arranged in the edge region of each of the first and second memory stacks ST1 and ST2 may be improved.

Figure 7:
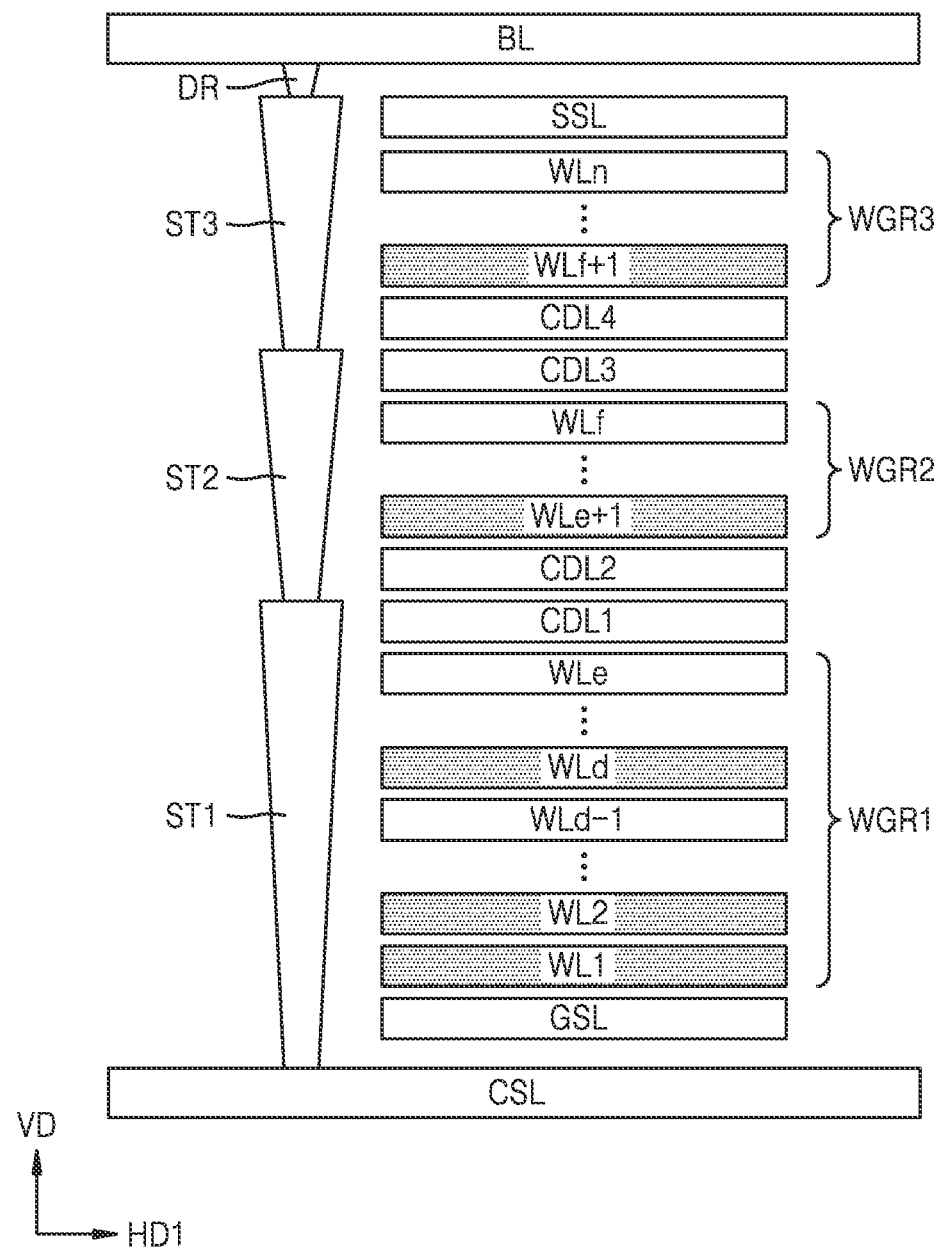

FIG. 7 illustrates an NVM 70 according to an example embodiment. The NVM 70 may correspond to a modified example of the NVM 60 of FIG. 6, and thus, duplicate descriptions thereof are omitted.

Referring to FIG. 7, the NVM 70 may include first through third memory stacks ST1, ST2, and ST3 extending in the vertical direction VD. In this case, the first memory stack ST1 may be arranged on the common source line CSL, the second memory stack ST2 may be arranged on the first memory stack ST1, and the third memory stack ST3 may be arranged on the second memory stack ST2 and connected to the bit line BL via the drain DR. The NVM 70 may further include first and second center dummy word lines CDL1 and CDL2 corresponding to the junction portion of the first and second memory stacks ST1 and ST2, and a third center dummy word line CDL3 and a fourth center dummy word line CDL4 corresponding to a junction portion of the second and third memory stacks ST2 and ST3.

In an example embodiment, the first memory stack ST1 may be connected to the first word line group WGR1, the second memory stack ST2 may be connected to the second word line group WGR2, and the third memory stack ST3 may be connected to a third word line group WGR3. The first word line group WGR1 may include the first number of word lines WL1 through WLe, the second word line group WGR2 may include the second number of word lines WLe+1 through WLf, different from the first number, and the third word line group WGR3 may include a third number of word lines WLf+1 through WLn, different from the first number. In this case, f is a positive integer between e and n. For example, the first number may be greater than the second number and the third number. For example, the second number may be greater than the third number. In some example embodiments, word lines connected to at least one of the first through third memory stacks ST1, ST2, and ST3 may be grouped into a plurality of groups, and an erase operation may be independently performed for each group.

Referring to FIGS. 1 and 7, each block BLK may further include the third sub-block, the word lines WL1 through WLe included in the first word line group WGR1 may be connected to the first sub-block SUB_BLK1, and the word lines WLe+1 through WLf included in the second word line group WGR2 may be connected to the second sub-block SUB_BLK2, and the word lines WLf+1 through WLn included in the third word line group WGR3 may be connected to the third sub-block. The storage controller 11 may determine differently data densities of the memory cells included in at least one of the first through third sub-blocks SUB_BLK1 through SUB_BLK3.

In an example embodiment, the storage controller 11 may determine, as the SLCs or MLCs, lower memory cells each connected to the word lines WL1 and WL2 at the lower portion of the first word line group WGR1, may determine, as the SLC or MLC, the intermediate memory cell connected to the word line WLd at an intermediate portion of the first word line group WGR1, and may determine, as the TLCs or QLCs, memory cells respectively connected to the remaining word lines WLd−1, WLe−1, and WLe of the first word line group WGR1. In addition, the storage controller 11 may determine, as the SLCs or MLCs, lower memory cells connected to the word line WLe+1 at the lower portion of the second word line group WGR2, and may determine, as the TLCs or QLCs, memory cells each connected to the remaining word lines including a word line WLf of the second word line group WGR2. In addition, the storage controller 11 may determine, as the SLCs or MLCs, lower memory cells connected to the word line WLf+1 at the lower portion of the third word line group WGR3, and may determine, as the TLCs or QLCs, memory cells each connected to the remaining word lines including a word line WLn of the third word line group WGR3.

In each of the first through third memory stacks ST1, ST2, and ST3, the diameter of a lower channel hole may be less than the diameter of an upper channel hole, and in addition, the thickness of a charge storage layer corresponding to the lower channel hole may be less than the thickness of the charge storage layer corresponding to the upper channel hole, and accordingly, the lower memory cells corresponding to the lower channel hole may have lower reliability than the upper memory cells corresponding to the upper channel hole. According to example embodiments, in the first through third memory stacks ST1, ST2, and ST3, the number of bits of data stored in each of the lower memory cells arranged in an edge region may be determined to be relatively small. As a result, the reliability of the lower memory cells of each of the first through third memory stacks ST1, ST2, and ST3 may be improved.

In addition, according to example embodiments, in each of the first through third memory stacks ST1, ST2, and ST3, the number of bits of data stored in the intermediate memory cell, in which at least one of a channel hole size, a channel hole shape, and a charge storage layer thickness is different from those in other memory cells, may be determined to be relatively small. In an example, at a first level corresponding to the at least one first intermediate memory cell and a second level corresponding to other memory cells (e.g., upper memory cells), at least one of the channel hole size, the channel hole shape, and the charge storage layer thickness may be different from each other. As a result, the reliability of at least one intermediate memory cell of the first and second memory stacks ST1 and ST2 may be improved. In addition, according to example embodiments, the number of bits of data stored in at least one memory cell adjacent to the interface between the first and second memory stacks ST1 and ST2, and/or at least one memory cell adjacent to the interface between the second and third memory stacks ST2 and ST3 may be determined to be relatively small. Furthermore, in the third memory stack ST3, the number of bits of data stored in at least one memory cell adjacent to the bit line BL may also be determined to be relatively small. As a result, the reliability of the memory cells arranged in the edge region of each of the first through third memory stacks ST1, ST2, and ST3 may be improved.

Figure 8:
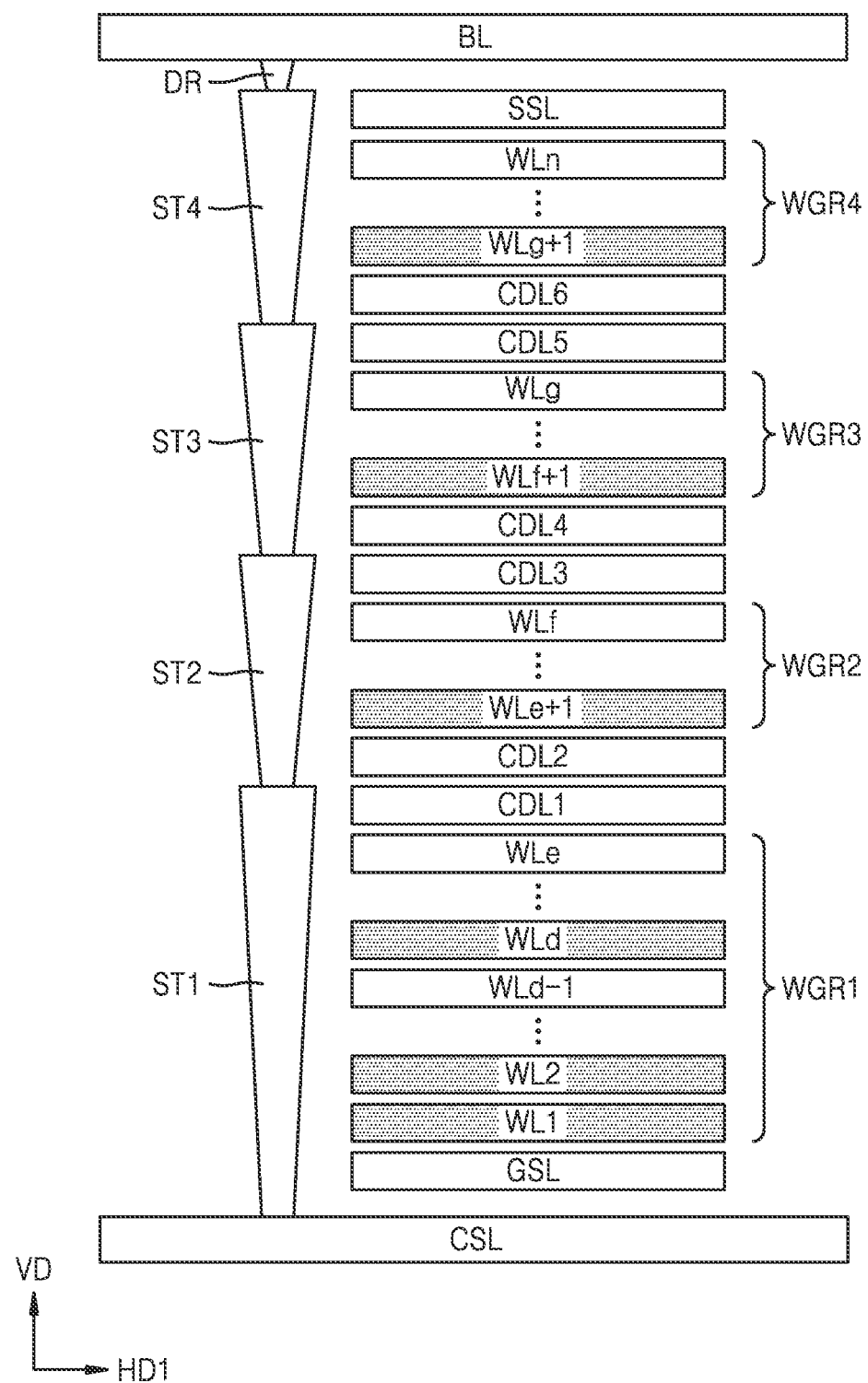

FIG. 8 illustrates an NVM 80 according to an example embodiment. The NVM 80 may correspond to a modified example of the NVM 70 of FIG. 7, and thus, duplicate descriptions thereof are omitted.

Referring to FIG. 8, the NVM 80 may include first through fourth memory stacks ST1, ST2, ST3, and ST4 extending in the vertical direction VD. In this case, the third memory stack ST3 may be arranged on the second memory stack ST2, and a fourth memory stack ST4 may be arranged on the third memory stack ST3 and connected to the bit line BL via the drain DR. The NVM 80 may further include a fifth center dummy word line CDL5 and a sixth center dummy word line CDL6 corresponding to a junction portion of the third memory stack ST3 and the fourth memory stack ST4.

In an example embodiment, the first memory stack ST1 may be connected to the first word line group WGR1, the second memory stack ST2 may be connected to the second word line group WGR2, and the third memory stack ST3 may be connected to the third word line group WGR3, and the fourth memory stack ST4 may be connected to a fourth word line group WGR4. The first word line group WGR1 may include the first number of word lines WL1 through WLe, the second word line group WGR2 may include the second number of word lines WLe+1 through WLf, different from the first number, and the third word line group WGR3 may include a third number of word lines WLf+1 through WLg, different from the first number, and the fourth word line group WGR4 may include a fourth number of word lines WLg+1 through WLn, different from the first number. In this case, f is a positive integer between e and n. For example, g is a positive integer between f and n. For example, the first number may be greater than the second through fourth numbers. For example, the second number may be greater than the third number. For example, the third number may be greater than the fourth number. In some example embodiments, word lines connected to at least one of the first through fourth memory stacks ST1, ST2, ST3, and ST4 may be grouped into a plurality of groups, and an erase operation may be independently performed for each group.

Referring to FIGS. 1 and 8, each block BLK may further include the third sub-block and a fourth sub-block, the word lines WL1 through WLe included in the first word line group WGR1 may be connected to the first sub-block SUB_BLK1, and the word lines WLe+1 through WLf included in the second word line group WGR2 may be connected to the second sub-block SUB_BLK2, the word lines WLf+1 through WLg included in the third word line group WGR3 may be connected to the third sub-block, and the word lines WLg+1 through WLn included in the fourth word line group WGR4 may be connected to the fourth sub-block. The storage controller 11 may determine differently data densities of the memory cells included in at least one of the first through fourth sub-blocks SUB_BLK1 through SUB_BLK4.

In an example embodiment, the storage controller 11 may determine, as the SLCs or MLCs, lower memory cells each connected to the word lines WL1 and WL2 at the lower portion of the first word line group WGR1, may determine, as the SLC or MLC, the intermediate memory cell connected to the word line WLd at an intermediate portion of the first word line group WGR1, and may determine, as the TLCs or QLCs, memory cells respectively connected to the remaining word lines WLd−1, WLe−1, and WLe of the first word line group WGR1. In addition, the storage controller 11 may determine, as the SLCs or MLCs, lower memory cells connected to the word line WLe+1 at the lower portion of the second word line group WGR2, and may determine, as the TLCs or QLCs, memory cells each connected to the remaining word lines including a word line WLf of the second word line group WGR2. In addition, the storage controller 11 may determine, as the SLCs or MLCs, lower memory cells connected to the word line WLf+1 at the lower portion of the third word line group WGR3, and may determine, as the TLCs or QLCs, memory cells each connected to the remaining word lines including a word line WLg of the third word line group WGR3. Furthermore, the storage controller 11 may determine, as the SLCs or MLCs, lower memory cells connected to the word line WLg+1 at the lower portion of the fourth word line group WGR4, and may determine, as the TLCs or QLCs, memory cells each connected to the remaining word lines including a word line WLn of the fourth word line group WGR4.

In each of the first through fourth memory stacks ST1, ST2, ST3, and ST4, the diameter of the lower channel hole may be less than the diameter of the upper channel hole, and thus, the lower memory cells corresponding to the lower channel hole may have lower reliability than the upper memory cells corresponding to the upper channel hole. According to example embodiments, in the first through fourth memory stacks ST1, ST2, ST3, and ST4, the number of bits of data stored in each of the lower memory cells arranged in an edge region may be determined to be relatively small. As a result, the reliability of the lower memory cells of each of the first through fourth memory stacks ST1, ST2, ST3, and ST4 may be improved.

Figure 9:
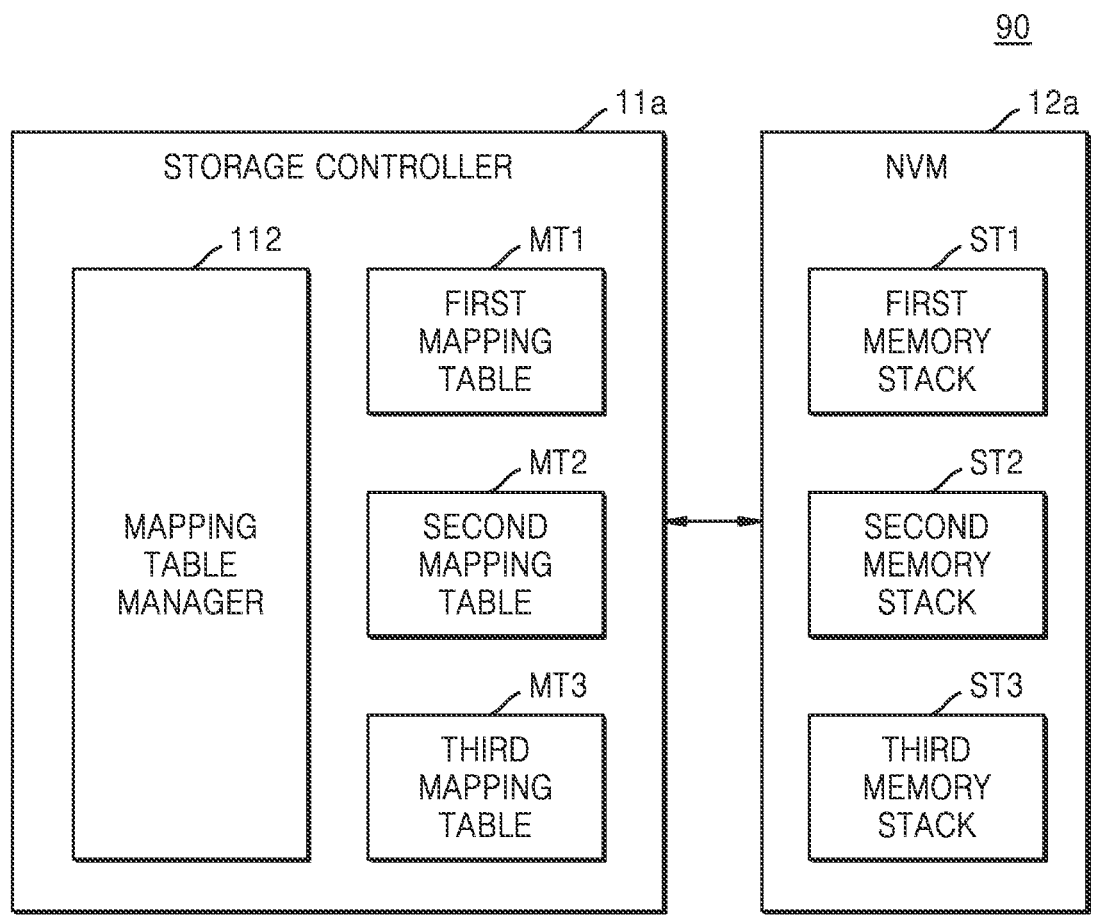
FIG. 9 is a block diagram of a storage device according to an example embodiment.

FIG. 9 is a block diagram of a storage device 90 according to an example embodiment.

Referring to FIG. 9, the storage device 90 may include a storage controller 11a and an NVM 12a, and may correspond to an implementation example of the storage device 10 in FIG. 1. The NVM 12a may include a plurality of memory stacks including first through third memory stacks ST1, ST2, and ST3 having different sizes. Each of the first through third memory stacks ST1, ST2, and ST3 may include a plurality of memory cells arranged in the vertical direction. For example, the first through third memory stacks ST1, ST2, and ST3 may be connected to first through third word line groups WGR1, WGR2, and WGR3 in FIG. 7, respectively.

The storage controller 11a may include the mapping table manager 112 and first through third mapping tables MT1, MT2, and MT3. For example, the first through third mapping tables MT1, MT2, and MT3 may be loaded into an operating memory in the storage controller 11a, for example, SRAM or DRAM. The first mapping table MT1 may correspond to the first memory stack ST1, the second mapping table MT2 may correspond to the second memory stack ST2, and the third mapping table MT3 may correspond to the third memory stack ST3.

In an example embodiment, the mapping table manager 112 may determine an amount of logical addresses allocated to each of the first through third mapping tables MT1, MT2, and MT3 during the address mapping operation. As described below, with reference to FIGS. 10A through 10C, the mapping table manager 112 may allocate the same number of logical addresses to each of the first through third mapping tables MT1, MT2, and MT3 during the address mapping operation. However, example embodiments are not limited thereto, and in some example embodiments, as described below with reference to FIGS. 11A through 11C, the mapping table manager 112 may also allocate different numbers of logical addresses to each of the first through third mapping tables MT1, MT2, and MT3.

FIGS. 10A through 10C illustrate first through third mapping tables MT1a, MT2a, and MT3a respectively corresponding to a plurality of memory groups, according to example embodiments.

Referring to FIGS. 9 and, 10A through 10C together, the first through third mapping tables MT1a, MT2a, and MT3a may respectively correspond to examples of the first through third mapping tables MT1, MT2, and MT3 in FIG. 9. For example, the logical address may include a logical page number LPN, and the physical address may be a physical page number PPN. The mapping table manager 112 may allocate m logical page numbers LPN_1a through LPN_1m to the first mapping table MT1a, allocate m logical page numbers LPN_2a through LPN_2m to the second mapping table MT2a, and allocate m logical page numbers LPN_3a through LPN_3m to the third mapping table MT3a.

For example, m logical page numbers LPN_1a through LPN_1m may be mapped to m physical page numbers PPN_1a through PPN_1m of the first memory stack ST1, respectively. For example, m logical page numbers LPN_2a through LPN_2m may be mapped to m physical page numbers PPN_2a through PPN_2m of the second memory stack ST2, respectively. For example, m logical page numbers LPN_3a through LPN_3m may be mapped to m physical page numbers PPN_3a through PPN_3m of the third memory stack ST3, respectively.

Accordingly, even when the first through third memory stacks ST1, ST2, and ST3 have different physical sizes, the erase operation on each of the first through third memory stacks ST1, ST2, and ST3 may not need to be individually managed, and the program/erase cycle for each of the first through third memory stacks ST1, ST2, and ST3 may not need to be individually managed. As a result, it may be possible, in the storage controller 11a, to reduce firmware resources and operational complexity for the erase operation and/or program/erase cycle management on the NVM 12a. Even when the first through third memory stacks ST1, ST2, and ST3 have different physical sizes, the amount of resources for performing erase operations in stack units may be reduced, and complexity of management and firmware for performing garbage collection and wear leveling may be reduced, and accordingly, the performance of the storage device 90 may be improved.

FIGS. 11A through 11C illustrate first through third mapping tables MT1b, MT2b, and MT3b respectively corresponding to a plurality of memory groups, according to example embodiments.

Referring to FIGS. 9, 11A through 11C together, the first through third mapping tables MT1b, MT2b, and MT3b may respectively correspond to examples of the first through third mapping tables MT1, MT2, and MT3 in FIG. 9. For example, the logical address may include a logical page number LPN, and the physical address may be a physical page number PPN. The mapping table manager 112 may allocate m logical page numbers LPN_1a through LPN_1m to the first mapping table MT1b, allocate k logical page numbers LPN_2a through LPN_2k to the second mapping table MT2b, and allocate i logical page numbers LPN_3a through LPN_3i to the third mapping table MT3b. In this case, m, k, and i may be positive integers, and m may be greater than k, and k may be greater than i.

For example, m logical page numbers LPN_1a through LPN_1m may be mapped to m physical page numbers PPN_1a through PPN_1m of the first memory stack ST1, respectively. For example, k logical page numbers LPN_2a through LPN_2k may be mapped to k physical page numbers PPN_2a through PPN_2k of the second memory stack ST2, respectively. For example, i logical page numbers LPN_3a through LPN_3i may be mapped to i physical page numbers PPN_3a through PPN_3i of the third memory stack ST3, respectively. In this manner, the mapping table manager 112 may also generate first through third mapping tables MT1b, MT2b, and MT3b to correspond to sizes of the first through third memory stacks ST1, ST2, and ST3, respectively.

Figure 12:
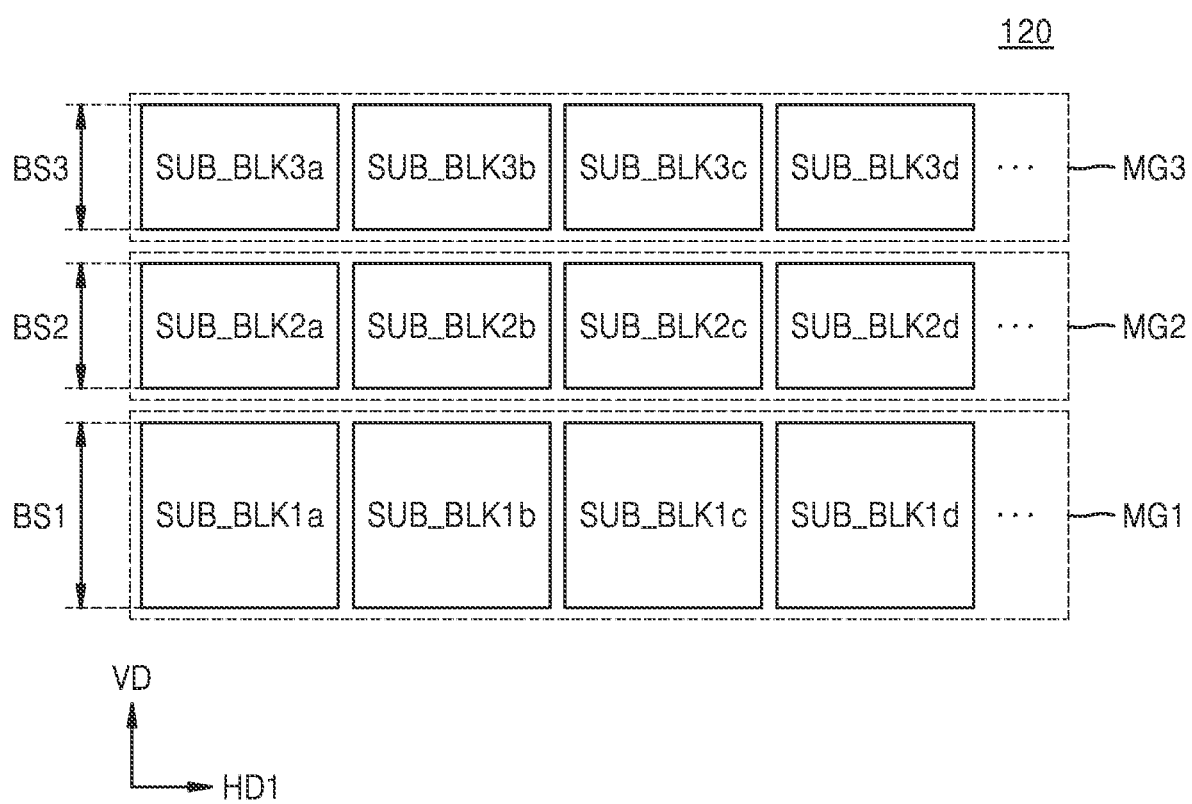
FIG. 12 illustrates a non-volatile memory including sub-blocks having different physical sizes, according to an example embodiment.

FIG. 12 illustrates an NVM 120 including sub-blocks having different physical sizes, according to an example embodiment.

Referring to FIG. 12, the NVM 120 may include first through third memory groups MG1, MG2, and MG3. The first memory group MG1 may include first sub-blocks SUB_BLK1a through SUB_BLK1d arranged in the first horizontal direction HD1, the second memory group MG2 may include second sub-blocks SUB_BLK2a through SUB_BLK2d arranged in the first horizontal direction HD1, and the third memory group MG3 may include third sub-blocks SUB_BLK3a through SUB_BLK3d arranged in the first horizontal direction HD1. For example, each of the first sub-blocks SUB_BLK1a through SUB_BLK1d may be connected to the first word line group WGR1 in FIG. 7, each of the second sub-blocks SUB_BLK2a through SUB_BLK2d may be connected to the second word line group WGR2 in FIG. 7, and each of the third sub-blocks SUB_BLK3a through SUB_BLK3d may be connected to the third word line group WGR3 in FIG. 7.

Each of the first sub-blocks SUB_BLK1a through SUB_BLK1d may have a first block size BS1 in the vertical direction VD, each of the second sub-blocks SUB_BLK2a through SUB_BLK2d may have a second block size BS2 in the vertical direction VD, and each of the third sub-blocks SUB_BLK3a through SUB_BLK3d may have a third block size BS3 in the vertical direction VD. In this case, the first through third block sizes BS1, BS2, and BS3 may be different from each other. For example, the first block size BS1 may be greater than the second block size BS2, and the second block size BS2 may be greater than the third block size BS3.

Referring to FIGS. 9 and 12 together, the mapping table manager 112 may manage an address mapped to the first memory group MG1 by using the first mapping table MT1, manage an address mapped to the second memory group MG2 by using the second mapping table MT2, and manage an address mapped to the third memory group MG3 by using the third mapping table MT3. In this case, the mapping table manager 112 may determine, as the same or similar to each other, amounts of logical addresses mapped to each of the first through third memory groups MG1, MG2, and MG3.

Figure 13A:
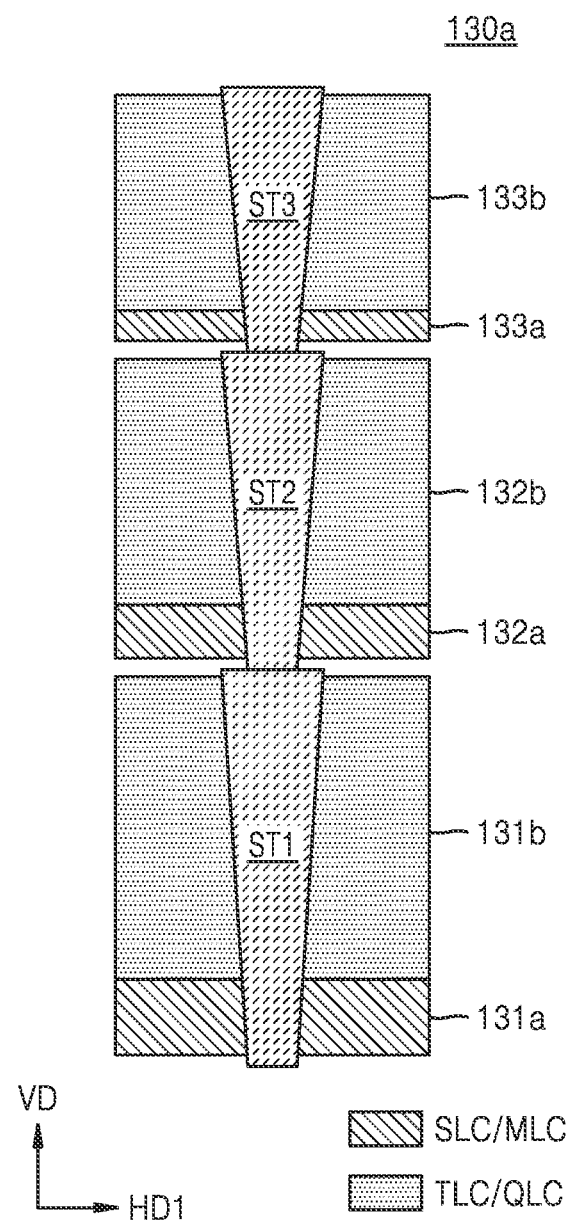
FIGS. 13A, 13B, 14A, 14B, 15 and 16 illustrate non-volatile memories having multi stack structures, according to some example embodiments.

FIG. 13A illustrates an NVM 130a having a multi stack structure according to an example embodiment.

Referring to FIG. 13A, the NVM 130a may include first through third memory stacks ST1, ST2, and ST3 arranged in the vertical direction VD. For example, the first through third memory stacks ST1, ST2, and ST3 may respectively correspond to the first through third memory stacks ST1, ST2, and ST3 in FIG. 7, and accordingly, the number of word lines connected to the first memory stack ST1 may be greater than the number of word lines connected to the second memory stack ST2, and the number of word lines connected to the second memory stack ST2 may be greater than the number of word lines connected to the third memory stack ST3.

In an example embodiment, the first memory stack ST1 may include at least one first memory cell storing M-bit data and the plurality of second memory cells each storing N-bit data, the second memory stack ST2 may include at least one third memory cell storing K-bit data, and the plurality of fourth memory cells each storing L-bit data, wherein M, N, K, and L are positive integers, N is greater than M, and L is greater than K. In an example embodiment, the third memory stack ST3 may include at least one third lower memory cell and the plurality of third upper memory cells each storing L-bit data, and the number of bits of data stored in at least one third lower memory cell may be less than L.

In the first memory stack ST1, the number of bits of data stored in each of first lower memory cells 131a may be less than the number of bits of data stored in each of first upper memory cells 131b. In this regard, the first lower memory cells 131a may correspond to less-bit-per-cell (LBPC) layers storing a small number of bits per cell, and the first upper memory cells 131b may correspond to more-bit-per-cell (MBPC) layers storing a large number of bits per cell. For example, the first lower memory cells 131a may be determined as the SLCs or MLCs, and the first upper memory cells 131b may be determined as the TLCs or QLCs, but example embodiments are not limited thereto. In some example embodiments, the number of bits of data stored in each of the first upper memory cells 131b may also be 5 or more.

In the second memory stack ST2, the number of bits of data stored in each of second lower memory cells 132a may be less than the number of bits of data stored in each of second upper memory cells 132b. In this regard, the second lower memory cells 132a may correspond to the LBPC layers, and the second upper memory cells 132b may correspond to the MBPC layers. For example, the second lower memory cells 132a may be determined as the SLCs or MLCs, and the second upper memory cells 132b may be determined as the TLCs or QLCs. For example, the second lower memory cells 132a may be determined as the SLCs, and the second upper memory cells 132b may be determined as the MLCs, TLCs or QLCs.

In the third memory stack ST3, the number of bits of data stored in each of third lower memory cells 133a may be less than the number of bits of data stored in each of third upper memory cells 133b. In this regard, the third lower memory cells 133a may correspond to the LBPC layers, and the third upper memory cells 133b may correspond to the MBPC layers. For example, the third lower memory cells 133a may be determined as the SLCs or MLCs, and the third upper memory cells 133b may be determined as the TLCs or QLCs. For example, the third lower memory cells 133a may be determined as the SLCs, and the third upper memory cells 133b may be determined as the MLCs, TLCs or QLCs.

The number of LBPC layers included in each of the first through third memory stacks ST1, ST2, and ST3 may be different from each other. In an example embodiment, the number of LBPC layers included in the memory stack may increase toward a lower portion thereof in the vertical direction VD. For example, the number of LBPC layers included in the first memory stack ST1 may be greater than the number of LBPC layers included in the second memory stack ST2 or the number of LBPC layers included in the third memory stack ST3. In this regard, the number of first lower memory cells 131a may be greater than the number of second lower memory cells 132a or the number of third lower memory cells 133a. Also, for example, the number of second lower memory cells 132a may be greater than the number of third lower memory cells 133a.

Figure 13B:
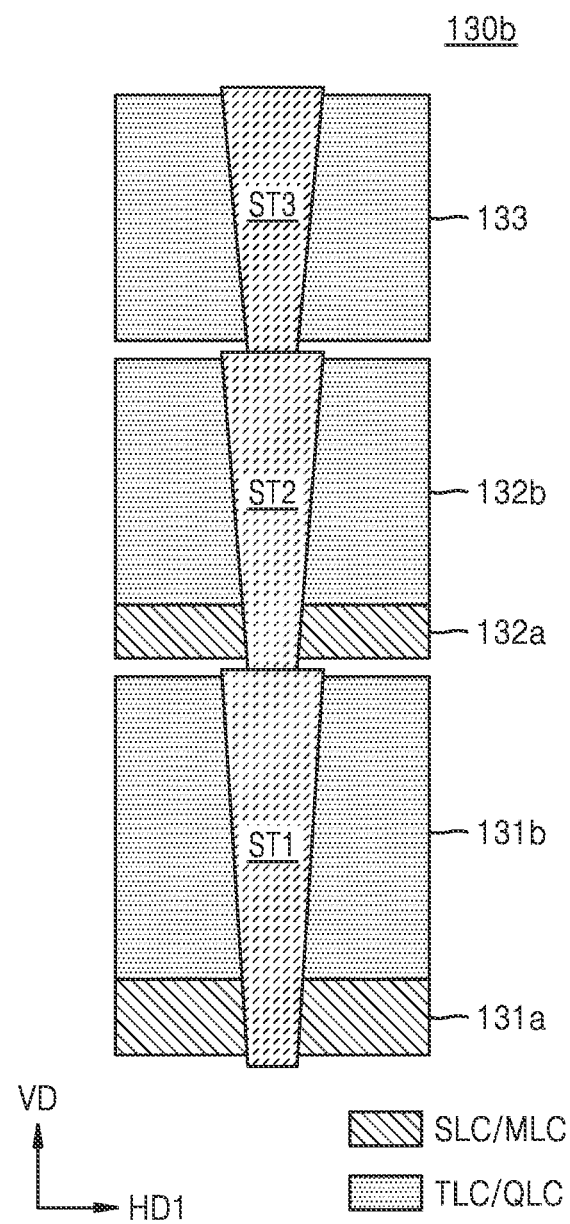

FIG. 13B illustrates an NVM 130b having a multi stack structure according to an example embodiment. The NVM 130b may correspond to a modified example of the NVM 130a of FIG. 13A, and thus, duplicate descriptions thereof are omitted.

Referring to FIG. 13B, according to example embodiments, some of the first through third memory stacks ST1, ST2, and ST3, for example, the first and second memory stacks ST1 and ST2 may include the LBPC layers, and other memory stacks, for example, the third memory stack ST3 may not include the LBPC layers. For example, in each of the first and second memory stacks ST1 and ST2, the memory cells may each store data having different numbers of bits depending on the positions thereof in the vertical direction VD. On the other hand, each of the memory cells 133 included in the third memory stack ST3 may store data having the same number of bits. For example, the memory cells 133 may be determined as the TLCs or QLCs. However, example embodiments are not limited thereto, and the memory cells 133 may also be determined as the SLCs or MLCs.

Figure 14A:
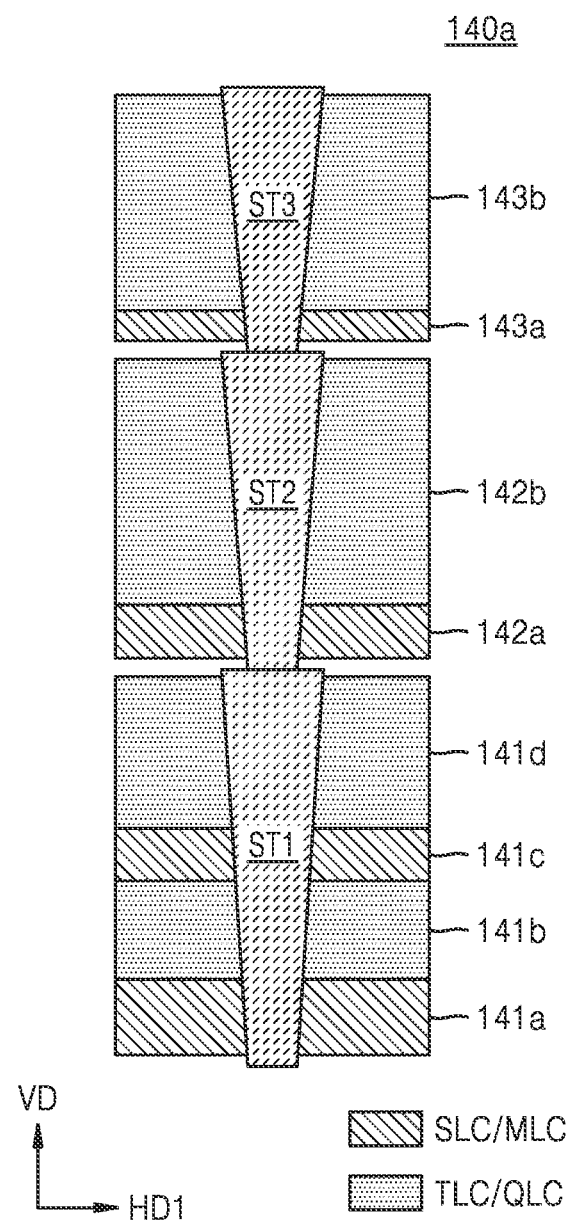

FIG. 14A illustrates an NVM 140a having a multi stack structure according to an example embodiment. The NVM 140a may correspond to a modified example of the NVM 130a of FIG. 13A, and thus, duplicate descriptions thereof are omitted.

Referring to FIG. 14A, in the first memory stack ST1, first lower memory cells 141a and first intermediate memory cells 141c may have relatively low data density, that is, each of the first lower memory cells 141a and the first intermediate memory cells 141c may store a relatively small number of bits of data. For example, the first lower memory cells 141a and the first intermediate memory cells 141c may be determined as the SLCs or MLCs, but example embodiments are not limited thereto. For example, the first lower memory cells 141a may be determined as the SLCs, and the first intermediate memory cells 141c may be determined as the MLCs.

In the first memory stack ST1, first memory cells 141b between the first lower memory cells 141a and the first intermediate memory cells 141c and the first memory cells 141d on the first intermediate memory cells 141c may have relatively high data density, that is, each of the first memory cells 141b and 141d may store a relatively large number of bits of data. For example, the first memory cells 141b and 141d may be determined as the TLCs or QLCs, but example embodiments are not limited thereto. For example, the first memory cells 141b may be determined as the TLCs, and the first memory cells 141d may be determined as the QLCs. In some example embodiments, the number of bits of data stored in each of the first memory cells 141b and 141d may also be 5 or more.

In the second memory stack ST2, the number of bits of data stored in each of second lower memory cells 142a may be less than the number of bits of data stored in each of second upper memory cells 142b. For example, the second lower memory cells 142a may be determined as the SLCs or MLCs, and the second upper memory cells 142b may be determined as the TLCs or QLCs. In the third memory stack ST3, the number of bits of data stored in each of third lower memory cells 143a may be less than the number of bits of data stored in each of third upper memory cells 143b. For example, the third lower memory cells 143a may be determined as the SLCs or MLCs, and the third upper memory cells 143b may be determined as the TLCs or QLCs.

In an example embodiment, the number of first lower memory cells 141a may be greater than the number of second lower memory cells 142a, and the number of second lower memory cells 142a may be greater than the number of third lower memory cells 143a. In an example embodiment, the sum of the number of first lower memory cells 141a and the number of first intermediate memory cells 141c may be greater than the number of second lower memory cells 142a or the number of third lower memory cells 143a.

Figure 14B:
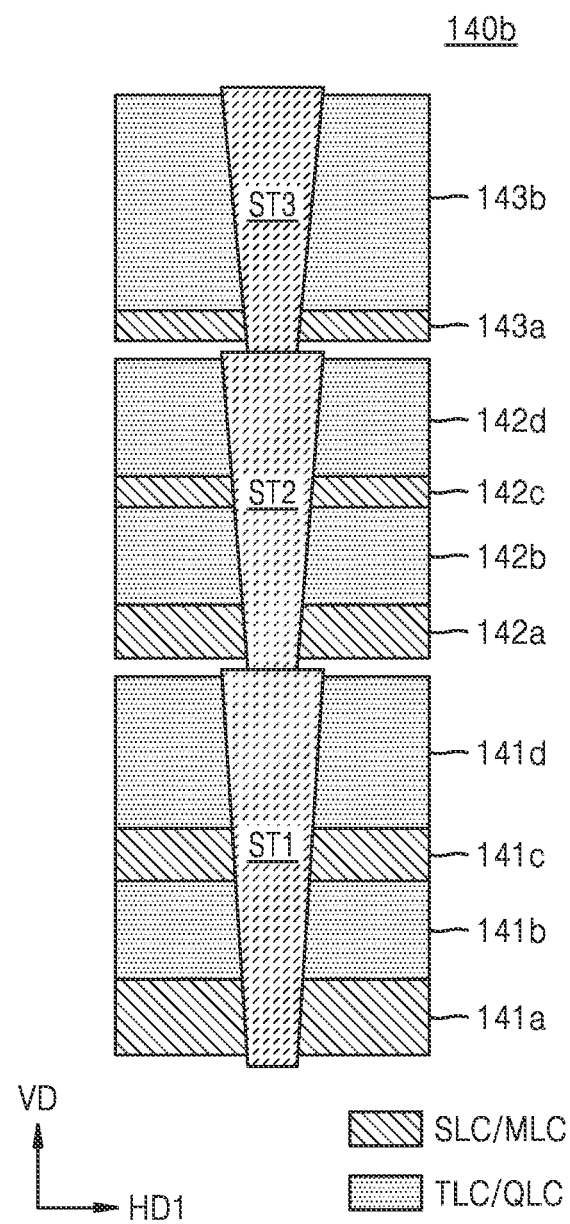

FIG. 14B exemplarily illustrates an NVM 140b having a multi stack structure according to an example embodiment. The NVM 140b may correspond to a modified example of the NVM 140a of FIG. 14A, and thus, duplicate descriptions thereof are omitted.

Referring to FIG. 14B, in the second memory stack ST2, data density of each of the second lower memory cells 142a and the second intermediate memory cells 142c may be relatively low, and data density of each of the second upper memory cells 142b between the second lower memory cells 142a and the second intermediate memory cells 142c and second memory cells 142d on the second intermediate memory cells 142c may be relatively high. For example, the second lower memory cells 142a and the second intermediate memory cells 142c may be determined as the SLCs or MLCs, but example embodiments are not limited thereto. For example, the second lower memory cells 142a may be determined as the SLCs, and the second intermediate memory cells 142c may be determined as the MLCs. For example, the second upper memory cells 142b and second memory cells 142d may be determined as the TLCs or QLCs.

In an example embodiment, the number of first lower memory cells 141a may be greater than the number of second lower memory cells 142a, and the number of second lower memory cells 142a may be greater than the number of third lower memory cells 143a. In an example embodiment, the sum of the number of first lower memory cells 141a and the number of first intermediate memory cells 141c may be greater than the sum of the number of second lower memory cells 142a and the number of second intermediate memory cells 142c. In an example embodiment, the sum of the number of the second lower memory cells 142a and the number of the second intermediate memory cells 142c may be greater than the number of third lower memory cells 143a.

Figure 15:
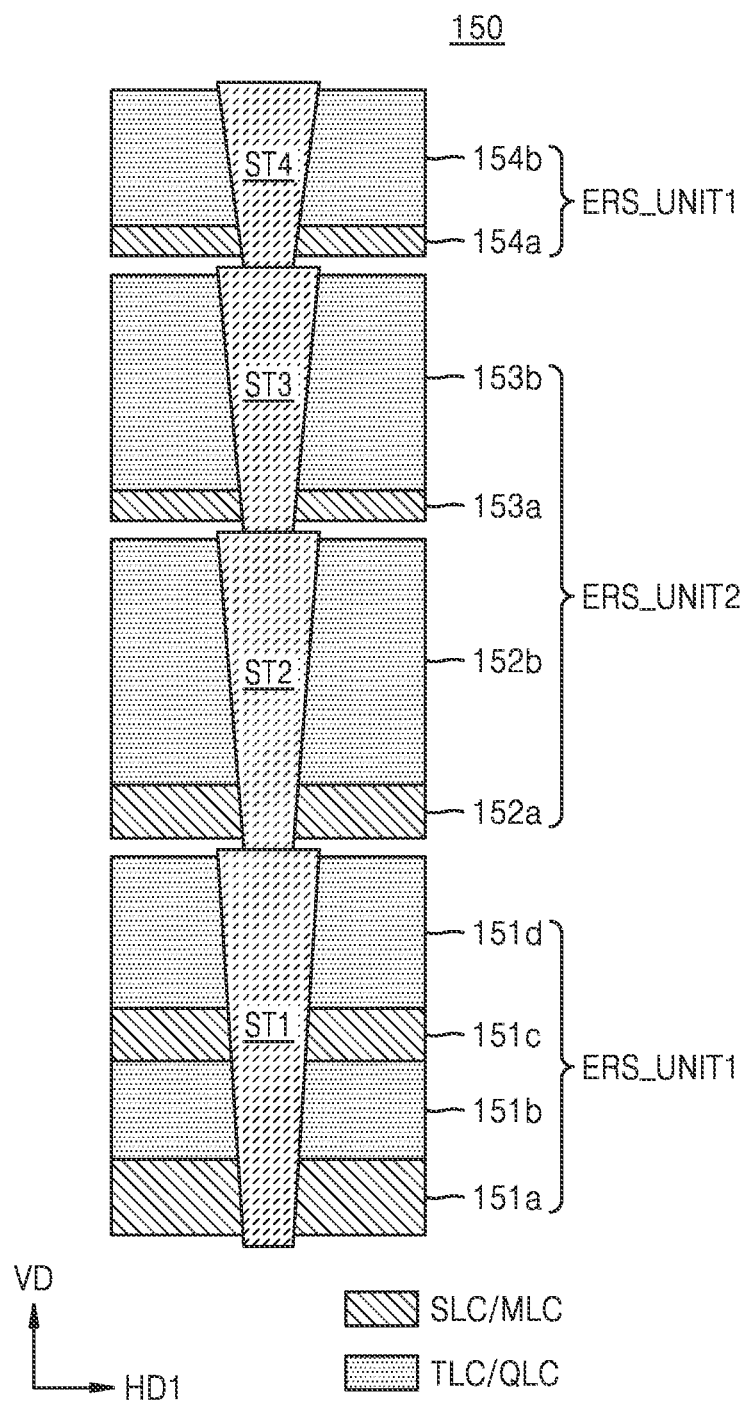

FIG. 15 illustrates an NVM 150 having a multi stack structure according to an example embodiment. The NVM 150 may correspond to a modified example of the NVM 130a of FIG. 13A, and thus, duplicate descriptions thereof are omitted.

Referring to FIG. 15, the NVM 150 may include first through fourth memory stacks ST1 through ST4 arranged in the vertical direction VD. Each of the first through fourth memory stacks ST1 through ST4 may extend in the vertical direction VD, and lengths in the vertical direction VD of the first through fourth memory stacks ST1 through ST4 may be different from each other. For example, the length in the vertical direction VD of the first memory stack ST1 may be greater than the length in the vertical direction VD of the second memory stack ST2, the length in the vertical direction VD of the second memory stack ST2 may be greater than the length in the vertical direction VD of the third memory stack ST3, and the length in the vertical direction VD of the third memory stack ST3 may be greater than the length in the vertical direction VD of the fourth memory stack ST4.

The first memory stack ST1 may include first lower memory cells 151a and first intermediate memory cells 151c having relatively low data density, and first memory cells 151b and 151d having relatively high data density. The second memory stack ST2 may include second lower memory cells 152a having relatively low data density and second upper memory cells 152b having relatively high data density. The third memory stack ST3 may include third lower memory cells 153a having relatively low data density and third upper memory cells 153b having relatively high data density. The fourth memory stack ST4 may include fourth lower memory cells 154a having relatively low data density and fourth upper memory cells 154b having relatively high data density. For example, the first through fourth lower memory cells 151a through 154a, and the first intermediate memory cells 151c may be determined as the SLCs or MLCs, and the first memory cells 151b and 151d and second through fourth upper memory cells 152b through 154b may be determined as the TLCs or QLCs, but example embodiments are not limited thereto.

In an example embodiment, the number of first lower memory cells 151a may be greater than the number of second lower memory cells 152a, the number of second lower memory cells 152a may be greater than the number of third lower memory cells 153a, and the number of third lower memory cells 153a may be greater than the number of fourth lower memory cells 154a. In an example embodiment, the sum of the number of first lower memory cells 151a and the number of first intermediate memory cells 151c may be greater than the number of second lower memory cells 152a, the number of third lower memory cells 153a, or the number of fourth lower memory cells 154a.

In an example embodiment, the first and fourth memory stacks ST1 and ST4 may correspond to a first erase unit ERS_UNIT1, the second and third memory stacks ST2 and ST3 may correspond to a second erase unit ERS_UNIT2, and erase operations may be performed independently on each of the first and second erase units ERS_UNIT1 and ERS_UNIT2. Accordingly, the first memory stack ST1 having a large size and the fourth memory stack ST4 having a small size may be simultaneously erased, and the second and third memory stacks ST2 and ST3 having medium sizes may be simultaneously erased.

For example, the sum of the length in the vertical direction VD of the first memory stack ST1 and the length in the vertical direction VD of the fourth memory stack ST4 may be substantially the same as or similar to the sum of the length in the vertical direction VD of the second memory stack ST2 and the length in the vertical direction VD of the third memory stack ST3. For example, the number of logical addresses assigned to the first and fourth memory stacks ST1 and ST4 may be substantially the same as or similar to the number of logical addresses assigned to the second and third memory stacks ST2 and ST3. In this manner, by keeping constant the number of logical addresses corresponding to each erase unit, resources required to perform the erase operation may be reduced, and as a result, the efficiency of the storage device may be improved.

Figure 16:
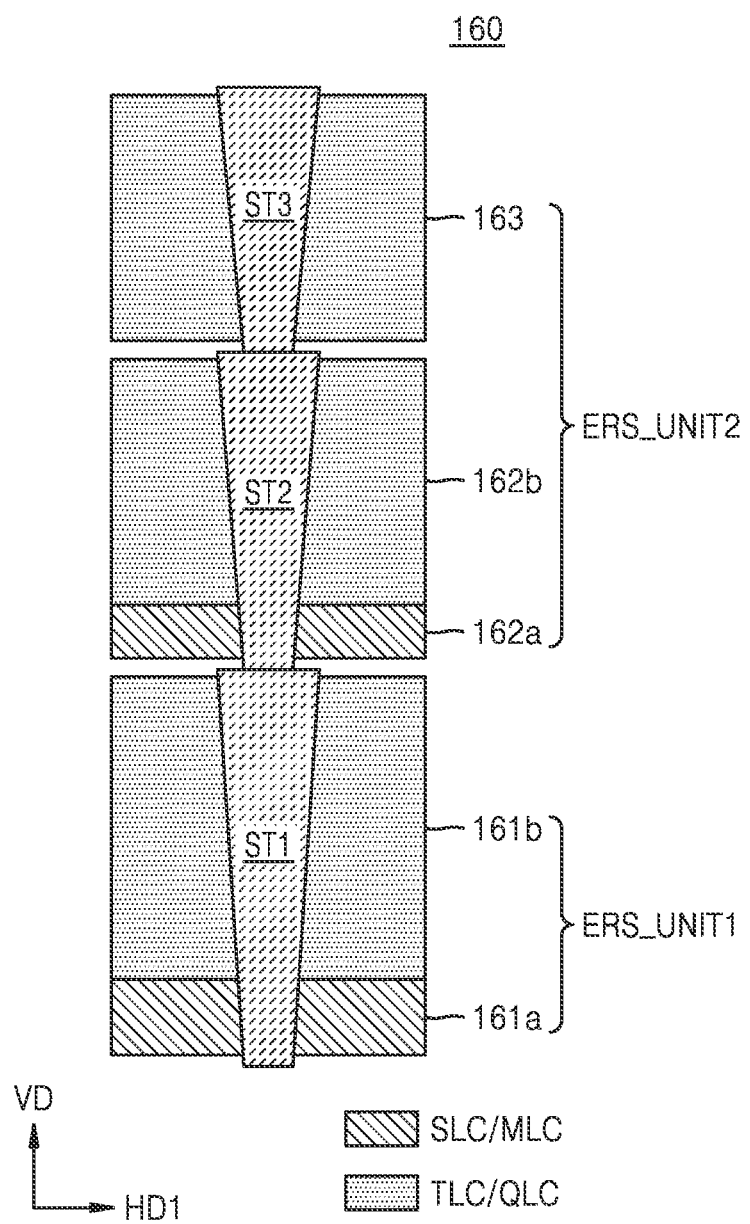

FIG. 16 illustrates an NVM 160 having a multi stack structure according to an example embodiment. The NVM 160 may correspond to a modified example of the NVM 130b of FIG. 13B, and thus, duplicate descriptions thereof are omitted.

Referring to FIG. 16, the NVM 160 may include first through third memory stacks ST1, ST2, and ST3 arranged in the vertical direction VD. Each of the first through third memory stacks ST1 through ST3 may extend in the vertical direction VD, and lengths in the vertical direction VD of the first through third memory stacks ST1 through ST3 may be different from each other. For example, the length in the vertical direction VD of the first memory stack ST1 may be greater than the length in the vertical direction VD of the second memory stack ST2, and the length in the vertical direction VD of the second memory stack ST2 may be greater than the length in the vertical direction VD of the third memory stack ST3.

The first memory stack ST1 may include first lower memory cells 161a having relatively low data density and first upper memory cells 161b having relatively high data density. The second memory stack ST2 may include second lower memory cells 162a having relatively low data density and second upper memory cells 162b having relatively high data density. The third memory stack ST3 may include third memory cells 163. For example, the first and second lower memory cells 161a and 162a may be determined as the SLCs or MLCs, and the first and second upper memory cells 161b and 162b and the third memory cells 163 may be determined as the TLCs or QLCs, but example embodiments are not limited thereto.

In an example embodiment, the first memory stack ST1 may correspond to the first erase unit ERS_UNIT1, the second memory stack ST2 and the third memory stack ST3 may correspond to the second erase unit ERS_UNIT2, and erase operations may be performed independently on each of the first and second erase units ERS_UNIT1 and ERS_UNIT2. Accordingly, the second memory stack ST2 having a medium size and the third memory stack ST3 having a small size may be simultaneously erased, and the first memory stack ST1 having a large size may be erased separately.

For example, the sum of the length in the vertical direction VD of the second memory stack ST2 and the length in the vertical direction VD of the third memory stack ST3 may be substantially the same as or similar to the length in the vertical direction VD of the first memory stack ST1. For example, the number of logical addresses assigned to the second and third memory stacks ST2 and ST3 may be substantially the same as or similar to the number of logical addresses assigned to the first memory stack ST1. In this manner, by keeping constant the number of logical addresses corresponding to each erase unit, resources required to perform the erase operation may be reduced, and as a result, the efficiency of the storage device may be improved.

Figure 17:
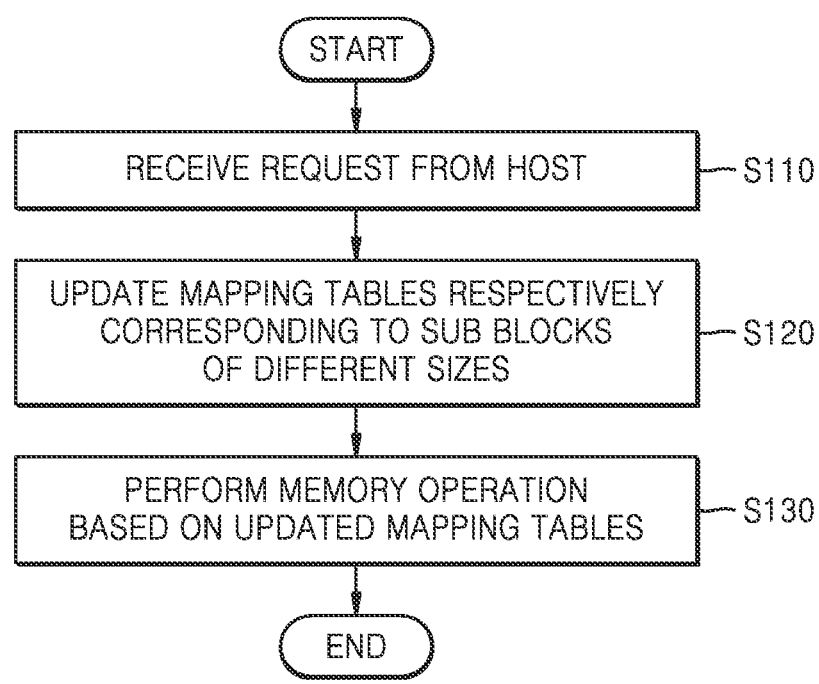
FIG. 17 is a flowchart of an operating method of a storage device, according to an example embodiment.

FIG. 17 is a flowchart of an operating method of a storage device, according to an example embodiment. The operating method of the storage device may be performed, for example, in the storage device 10 in FIG. 1.

Referring to FIGS. 1 and 17 together, in operation S110, the storage device 10 may receive a request from the host 20. For example, the request may include a write request or a read request. For another example, the request may also include an erase request. In operation S120, the storage device 10 may update mapping tables respectively corresponding to sub-blocks having different sizes. In an example embodiment, the storage device 10 may perform an address mapping operation so that the number of logical addresses allocated to each of the sub-blocks is the same. In operation S130, the storage device 10 performs a memory operation based on the updated mapping tables. For example, when the write request is received, the memory operation may correspond to a data program or a write operation. For example, when the read request is received, the memory operation may correspond to the read operation.

Figure 18:
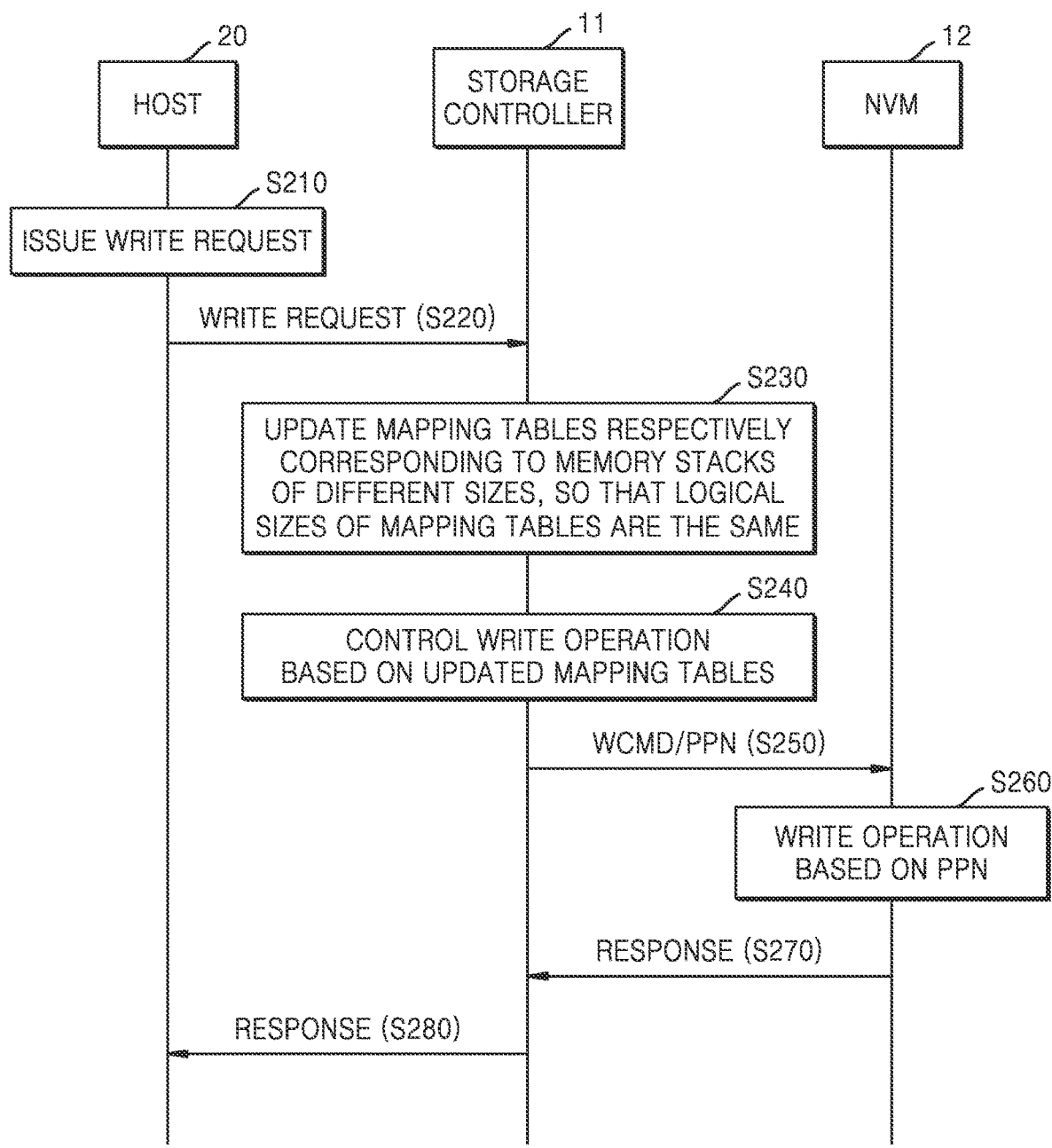
FIG. 18 is a flowchart of a write operation method according to an example embodiment.

FIG. 18 is a flowchart of a write operation method according to an example embodiment.

Referring to FIG. 18, the write operation method may be performed in the host 20, the storage controller 11, and the NVM 12 in FIG. 1. The descriptions given above with reference to FIGS. 1 through 17 may also be applied to the following description, and thus, duplicate descriptions thereof are omitted. In operation S210, the host 20 may issue the write request. In operation S220, the host 20 may transmit the write request to the storage controller 11. In operation S230, the storage controller 11 may update the mapping tables respectively corresponding to the memory stacks of different sizes so that the logical sizes of the mapping tables are the same.

In operation S240, the storage controller 11 may control the write operation based on the updated mapping tables. For example, the storage controller 11 may generate a write command WCMD corresponding to the write request. For example, the storage controller 11 may generate a physical address, for example, a physical page number PPN, according to the updated mapping tables. In operation S250, the storage controller 11 may transmit the write command WCMD and the physical page number PPN to the NVM 12. In operation S260, the NVM 12 may perform the write operation based on the physical page number PPN. In operation S270, the NVM 12 may transmit, to the storage controller 11, a response message indicating completion of the write operation corresponding to the write command WCMD. In operation S280, the storage controller 11 may transmit, to the host 20, a response message indicating completion of the write operation corresponding to the write request.

Figure 19:
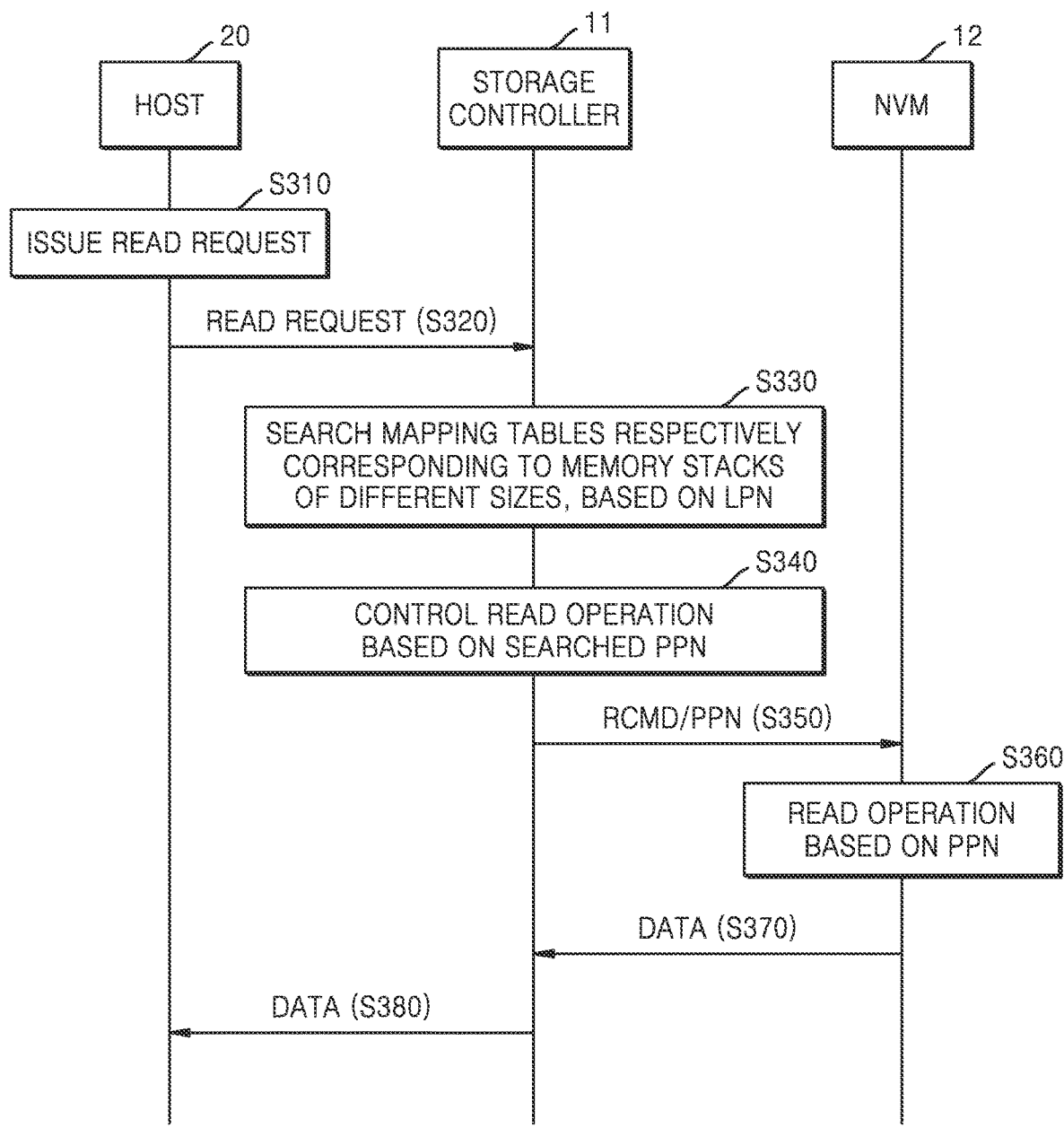
FIG. 19 is a flowchart of a read operation method according to an example embodiment.

FIG. 19 is a flowchart of a read operation method according to an example embodiment.

Referring to FIG. 19, the read operation method may be performed in the host 20, the storage controller 11, and the NVM 12 in FIG. 1. The descriptions given above with reference to FIGS. 1 through 17 may also be applied to the following description, and thus, duplicate descriptions thereof are omitted. In operation S310, the host 20 may issue the read request. In operation S320, the host 20 may transmit the read request to the storage controller 11. In this case, the read request may include a logical address, for example, the logical page number LPN. In operation S330, the storage controller 11 may search mapping tables respectively corresponding to memory stacks of different sizes, based on the logical page number LPN.

In operation S340, the storage controller 11 may control the read operation based on the physical page number PPN corresponding to the logical page number LPN. For example, the storage controller 11 may generate a read command RCMD corresponding to the read request. For example, the storage controller 11 may generate the physical page number PPN corresponding to the logical page number LPN by using the mapping tables. In operation S350, the storage controller 11 may transmit the read command RCMD and the physical page number PPN to the NVM 12. In operation S360, the NVM 12 may perform the read operation based on the physical page number PPN. In operation S370, the NVM 12 may transmit, to the storage controller 11, data read according to the read command RCMD. In operation S380, the storage controller 11 may transmit, to the host 20, data read according to the read request.

Figure 20:
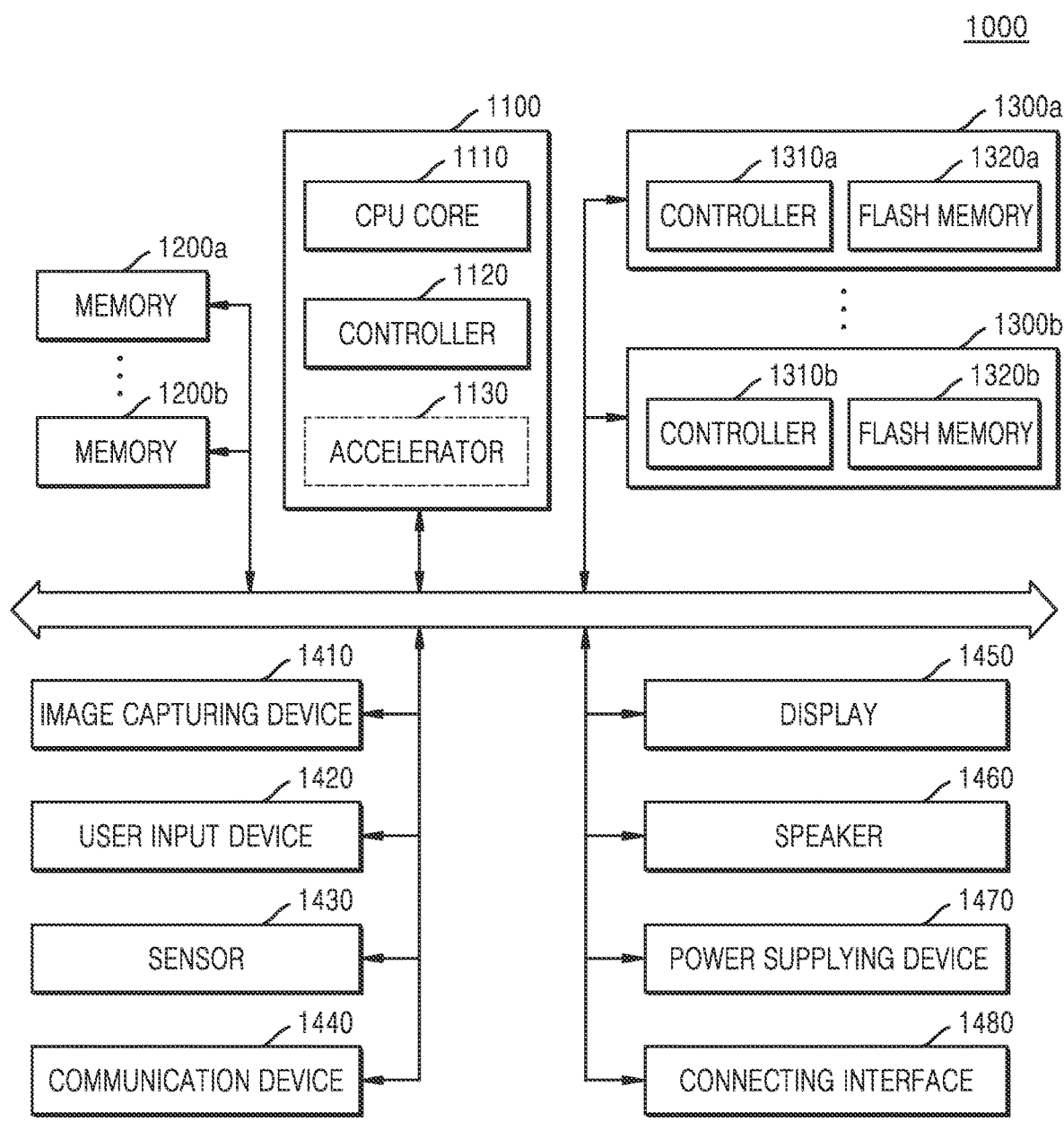
FIG. 20 is a system to which a storage device is applied according to an example embodiment.

FIG. 20 is a diagram of a system 1000 to which a storage device is applied, according to an example embodiment. The system 1000 of FIG. 20 may basically include a mobile system, such as a portable communication terminal (for example, a mobile phone), a smartphone, a tablet personal computer (PC), a wearable device, a healthcare device, and an Internet of things (IOT) device. However, the system 1000 of FIG. 20 is not necessarily limited to the mobile system, and may include a personal computer (PC), a laptop computer, a server, a media player, or an automotive device (for example, a navigation device).

Referring to FIG. 20, the system 1000 may include a main processor 1100, memories (for example, 1200a and 1200b), and storage devices (for example, 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control overall operations of the system 1000, or more particularly, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some example embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU), and be implemented as a chip that is physically separate from the other components of the main processor 1100.

The memories 1200a and 1200b may be used as main memory devices of the system 1000. Although each of the memories 1200a and 1200b may include a volatile memory, such as SRAM and/or DRAM, each of the memories 1200a and 1200b may include NVM, such as a flash memory, PRAM and/or RRAM. The memories 1200a and 1200b may be implemented in the same package as the main processor 1100.

The storage devices 1300a and 1300b may serve as non-volatile storage devices configured to store data regardless of whether power is supplied thereto, and may have larger storage capacity than the memories 1200a and 1200b. The storage devices 1300a and 1300b may respectively include storage controllers STRG CTRL 1310a and 1310b and NVMs 1320a and 1320b configured to store data under the control of the storage controllers 1310a and 1310b. Although the NVMs 1320a and 1320b may include flash memories having a 2D structure or a 3D V-NAND structure, the NVMs 1320a and 1320b may include other types of NVMs, such as PRAM and/or RRAM.

The storage devices 1300a and 1300b may be physically separated from the main processor 1100, and may be included in the system 1000 or implemented in the same package as the main processor 1100. In addition, the storage devices 1300a and 1300b may have types of SSDs or memory cards, and be removably combined with other components of the system 1000 via an interface such as the connecting interface 1480 to be described below. The storage devices 1300a and 1300b may include devices, to which a standard protocol, for example, a UFS, an eMMC, and an NVMe, is applied, but example embodiments are not limited thereto.

The image capturing device 1410 may capture still images or moving images. The image capturing device 1410 may include a camera, a camcorder, and/or a webcam.

The user input device 1420 may receive various types of data input by a user of the system 1000, and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transceive signals to and from other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied by a battery embedded in the system 1000 and/or an external power source, and supply the converted power to each of the components of the system 1000.

The connecting interface 1480 may provide connection between the system 1000 and an external device which is connected to the system 1000 and capable of transceiving data to and from the system 1000. The connecting interface 1480 may be implemented by using various interface schemes, such as advanced technology attachment (ATA), serial ATA (SATA), external SATA (e-SATA), a small computer small interface (SCSI), a serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

While aspects of example embodiments have been particularly shown and described, it will be understood that various changes in form and details may be made therein without departing from the spirit and scope of the following claims.

What is claimed is:

1. A non-volatile memory device comprising:
    a plurality of sub-blocks provided on a substrate in a vertical direction,
    wherein the plurality of sub-blocks comprises:
        a first sub-block connected to a first word line group comprising a first number of word lines; and
        a second sub-block connected to a second word line group comprising a second number of word lines,
    wherein the first sub-block comprises:
        at least one first memory cell storing M-bit data; and
        a plurality of second memory cells each storing N-bit data,
    wherein the second sub-block comprises:
        at least one third memory cell storing K-bit data; and
        a plurality of fourth memory cells each storing L-bit data,
    wherein the first sub-block and the second sub-block are independently erasable,
    wherein at least two of the plurality of second memory cells are adjacent along the vertical direction, and at least two of the plurality of fourth memory cells are adjacent along the vertical direction,
    wherein M, N, K, and L are positive integers, N is greater than M, and L is greater than K,
    wherein the first number and the second number are different, and the at least one first memory cell and the at least one third memory cell comprise different numbers of memory cells,
    wherein the at least one first memory cell is provided between the substrate and the plurality of second memory cells, and
    wherein the at least one third memory cell is provided between the plurality of second memory cells and the plurality of fourth memory cells.

2. The non-volatile memory device of claim 1, wherein the at least one first memory cell comprises more memory cells than the at least one third memory cell.

3. The non-volatile memory device of claim 1, wherein the first sub-block is between the substrate and the second sub-block,
    wherein the first sub-block corresponds to a first memory stack on the substrate, and
    wherein the second sub-block corresponds to a second memory stack.

4. The non-volatile memory device of claim 1, wherein a channel hole extends through the at least one first memory cell, the plurality of second memory cells, the at least one third memory cell and the plurality of fourth memory cells,
    wherein the channel hole is narrower at a first level corresponding to the at least one first memory cell than at a second level corresponding to the plurality of second memory cells, and
    wherein the channel hole is narrower at a third level corresponding to the at least one third memory cell than at a fourth level corresponding to the plurality of fourth memory cells.

5. The non-volatile memory device of claim 1, further comprising a charge storage layer provided in a channel hole that extends through the at least one first memory cell, the plurality of second memory cells, the at least one third memory cell and the plurality of fourth memory cells,
    wherein a first thickness of the charge storage layer at a first level corresponding to the at least one first memory cell is less than a second thickness of the charge storage layer at a second level corresponding to the plurality of second memory cells, and
    wherein a third thickness of the charge storage layer at a third level corresponding to the at least one third memory cell is less than a fourth thickness of the charge storage layer at a fourth level corresponding to the plurality of fourth memory cells.

6. The non-volatile memory device of claim 1, wherein the first sub-block further comprises at least one first intermediate memory cell provided between the at least one first memory cell and the plurality of second memory cells, the at least one first intermediate memory cell storing P-bit data, and wherein P is a positive integer greater than or equal to M and less than N.

7. The non-volatile memory device of claim 6, wherein at a first level corresponding to the at least one first intermediate memory cell and a second level corresponding to the plurality of second memory cells, at least one of a channel hole size, a channel hole shape, and a charge storage layer thickness, are different from each other.

8. The non-volatile memory device of claim 6, wherein the first sub-block comprises a first group and a second group, which are independently erasable, and wherein the at least one first intermediate memory cell is adjacent to an interface between the first group and the second group.

9. The non-volatile memory device of claim 1, wherein the second sub-block further comprises at least one second intermediate memory cell provided between the at least one third memory cell and the plurality of fourth memory cells, the at least one second intermediate memory cell storing P-bit data, and wherein P is a positive integer greater than or equal to K and less than L.

10. The non-volatile memory device of claim 1, wherein a number of logical addresses corresponding to the first sub-block is identical to a number of logical addresses corresponding to the second sub-block.

11. The non-volatile memory device of claim 1, wherein a number of logical addresses corresponding to the first sub-block is different from a number of logical addresses corresponding to the second sub-block.

12. The non-volatile memory device of claim 1, wherein a number of physical addresses corresponding to the first sub-block is different from a number of physical addresses corresponding to the second sub-block.

13. The non-volatile memory device of claim 1, wherein a number of physical addresses corresponding to the first sub-block is identical to a number of physical addresses corresponding to the second sub-block.

14. The non-volatile memory device of claim 1, wherein the plurality of sub-blocks further comprise a third sub-block connected to a third word line group comprising a third number of word lines, wherein the third sub-block comprises:
 at least one fifth memory cell;
 at least one third intermediate memory cell; and
 a plurality of sixth memory cells each storing L-bit data, and wherein the first number and the third number are different, and a number of bits of data stored in at least one of the at least one fifth memory cell and the at least one third intermediate memory cell is less than L.

15. The non-volatile memory device of claim 1, wherein M is 1 or 2, and each of the at least one first memory cell is a single level cell (SLC) or a multi level cell (MLC), wherein N is 3 or 4, and each of the plurality of second memory cells is a triple level cell (TLC) or a quadruple level cell (QLC), wherein K is 1 or 2, and each of the at least one third memory cell is an SLC or an MLC, and wherein L is 3 or 4, and each of the plurality of fourth memory cells is a TLC or a QLC.

16. A storage device comprising:
a non-volatile memory comprising a first sub-block connected to a first word line group and a second sub-block connected to a second word line group, wherein the first word line group comprises a first number of word lines, the second word line group comprises a second number of word lines provided above the first word line group in a vertical direction; and a storage controller configured to manage a first mapping table corresponding to the first sub-block and a second mapping table corresponding to the second sub-block, wherein the first sub-block comprises at least one first memory cell, at least one first intermediate memory cell, and a plurality of second memory cells, wherein each of the plurality of second memory cells stores N-bit data, and a number of bits of data stored in at least one of the at least one first memory cell and the at least one first intermediate memory cell is less than N, wherein the second sub-block comprises at least one third memory cell and a plurality of fourth memory cells, wherein each of the plurality of fourth memory cells stores L-bit data, and a number of bits of data stored in the at least one third memory cell is less than L, wherein the first sub-block and the second sub-block are independently erasable, wherein at least two of the plurality of second memory cells are adjacent along the vertical direction, and at least two of the plurality of fourth memory cells are adjacent along the vertical direction, wherein N and L are positive integers greater than or equal to 2, wherein the at least one first memory cell comprises more memory cells than the at least one third memory cell, wherein the plurality of second memory cells are provided above the at least one first memory cell in the vertical direction, and wherein the plurality of fourth memory cells are provided above the at least one third memory cell in the vertical direction.

17. The storage device of claim 16, wherein the storage controller is further configured to assign a common number of logical addresses to be assigned to each of the first mapping table and the second mapping table.

18. The storage device of claim 16, wherein the non-volatile memory further comprises:
a third sub-block provided above the second sub-block in the vertical direction, and connected to a third word line group comprising a third number of word lines; and a fourth sub-block provided above the third sub-block in the vertical direction, and connected to a fourth word line group comprising a fourth number of word lines, wherein the third number and the fourth number are less than the first number, and wherein the storage controller is further configured to:
 identify a first erase unit comprising the first sub-block and the fourth sub-block,
 identify a second erase unit comprising the second sub-block and the third sub-block, and
 independently control erase operations on the first erase unit and the second erase unit.

19. The storage device of claim 16, wherein the storage controller is further configured to assign a different number of logical addresses to the first mapping table and the second mapping table.

20. A non-volatile memory device comprising:
a first memory stack comprising first memory cells respectively connected to first word lines stacked on a substrate in a vertical direction; and a second memory stack comprising second memory cells respectively connected to second word lines stacked in the vertical direction, wherein the first word lines are provided between the substrate and the second word lines, and a second number of the second word lines is less than a first number of the first word lines, wherein the first memory cells comprise at least one first memory cell, at least one first intermediate memory cell, and a plurality of second memory cells, each of the plurality of second memory cells storing N-bit data, wherein the second memory cells comprise at least one third memory cell, at least one second intermediate memory cell, and a plurality of fourth memory cells, each of the plurality of fourth memory cells storing L-bit data, wherein a number of bits of data stored in at least one of the at least one first memory cell and the at least one first intermediate memory cell is less than N, wherein a number of bits of data stored in at least one of the at least one third memory cell and the at least one second intermediate memory cell is less than L, wherein the first memory stack and the second memory stack are independently erasable, wherein at least two of the plurality of second memory cells are adjacent along the vertical direction, and at least two of the plurality of fourth memory cells are adjacent along the vertical direction, wherein N and L are positive integers greater than or equal to 2, wherein the at least one first memory cell comprises a greater number of memory cells than the at least one third memory cell, and wherein a number of logical addresses corresponding to the first memory stack is identical to a number of logical addresses corresponding to the second memory stack.

* * * * *